(12) United States Patent
Puglia et al.

(10) Patent No.: US 9,943,789 B2
(45) Date of Patent: Apr. 17, 2018

(54) MODULAR FILTER CASSETTE

(71) Applicant: Entegris, Inc., Billerica, MA (US)

(72) Inventors: John P. Puglia, Townsend, MA (US); Louis Barrows, Jr., Billerica, MA (US); Christopher John Lowe, Merrimack, NH (US); Ben Mai Pak Lee, Pelham, NH (US); Marc Laverdiere, Wakefield, MA (US)

(73) Assignee: Entegris, Inc., Billerica, MA (US)

( * ) Notice: Subject to any disclaimer, the term of this patent is extended or adjusted under 35 U.S.C. 154(b) by 473 days.

(21) Appl. No.: 14/349,596

(22) PCT Filed: Oct. 3, 2012

(86) PCT No.: PCT/US2012/000427
§ 371 (c)(1),
(2) Date: Apr. 3, 2014

(87) PCT Pub. No.: WO2013/052082
PCT Pub. Date: Apr. 11, 2013

(65) Prior Publication Data
US 2014/0246383 A1  Sep. 4, 2014

Related U.S. Application Data

(60) Provisional application No. 61/542,645, filed on Oct. 3, 2011, provisional application No. 61/613,886, filed on Mar. 21, 2012.

(51) Int. Cl.
*B01D 29/07* (2006.01)
*B01D 35/30* (2006.01)
(Continued)

(52) U.S. Cl.
CPC ............ *B01D 35/12* (2013.01); *B01D 29/07* (2013.01); *B01D 35/303* (2013.01); *B01D 46/521* (2013.01); *B01D 2201/12* (2013.01)

(58) Field of Classification Search
None
See application file for complete search history.

(56) References Cited

U.S. PATENT DOCUMENTS

| 1,664,125 A | 3/1928 | Lowrey |
| 2,152,977 A | 4/1939 | Schindel |

(Continued)

FOREIGN PATENT DOCUMENTS

| CN | 1676189 | 10/2005 |
| CN | 102202760 | 9/2011 |

(Continued)

OTHER PUBLICATIONS

International Search Report and Written Opinion issued for PCT Application No. PCT/US2013/062745, dated May 21, 2014, 19 pages.

(Continued)

*Primary Examiner* — Benjamin M Kurtz

(57) ABSTRACT

The present disclosure relates to modular filtration cassettes for filtering liquids including, for example, liquids used in semiconductor manufacturing. A filter housing may define a filter cavity comprising an upstream portion and a downstream portion. The filter may further comprise a filter element disposed in the filter cavity. The filter element may at least partially overlap the filter inlet on a first side of the filter element. The filter element may comprise a rectangular pleated filter with a set of pleats having a first set of pleat tips on an upstream side of the filter element and a second set of pleat tips on a downstream side of the pleated filter.

11 Claims, 19 Drawing Sheets

(51) Int. Cl.
*B01D 46/52* (2006.01)
*B01D 35/12* (2006.01)

(56) References Cited

U.S. PATENT DOCUMENTS

| | | |
|---|---|---|
| 2,359,138 A | 9/1944 | Martin |
| 2,387,368 A | 10/1945 | Vokes |
| 2,419,004 A | 4/1947 | Bieker et al. |
| 3,596,932 A | 8/1971 | Kinsey |
| 3,712,583 A | 1/1973 | Martindale et al. |
| 3,948,777 A | 4/1976 | Murata et al. |
| 3,965,012 A | 6/1976 | Eguchi et al. |
| 4,043,239 A | 8/1977 | Defusco |
| 4,098,419 A | 7/1978 | Virog, Jr. et al. |
| 4,219,422 A | 8/1980 | Knothe et al. |
| 4,228,011 A | 10/1980 | Cote |
| 4,304,669 A | 12/1981 | Knothe et al. |
| 5,219,529 A | 6/1993 | Ngo et al. |
| 5,376,270 A | 12/1994 | Spearman |
| 5,405,528 A | 4/1995 | Selbie et al. |
| 5,468,449 A | 11/1995 | Sjogren et al. |
| 5,470,531 A | 11/1995 | Sjogren et al. |
| 5,543,047 A | 8/1996 | Stoyell et al. |
| 5,628,417 A | 5/1997 | Van Halteren |
| 5,871,239 A | 2/1999 | Boscaljon et al. |
| 6,050,609 A | 4/2000 | Boscaljon et al. |
| 6,073,973 A | 6/2000 | Boscaljon et al. |
| 6,117,390 A | 9/2000 | Corey, Jr. |
| 6,143,174 A | 11/2000 | Graus |
| 6,207,116 B1 | 3/2001 | Heed |
| 6,277,277 B1 | 8/2001 | Jacobi et al. |
| 6,378,907 B1 | 4/2002 | Campbell et al. |
| 6,409,784 B1 | 6/2002 | Wehr |
| 6,458,278 B1 | 10/2002 | Leoncavallo et al. |
| 6,511,098 B1 | 1/2003 | Luterstein |
| 6,568,540 B1 | 5/2003 | Holzmann et al. |
| 6,800,199 B1 | 10/2004 | Rhee |
| 6,908,121 B2 | 6/2005 | Hirth et al. |
| 7,021,667 B2 | 4/2006 | Campbell et al. |
| 7,037,424 B2 | 5/2006 | Niermeyer et al. |
| 7,080,619 B2* | 7/2006 | Kino ............ B01D 46/10 123/184.57 |
| 7,163,237 B2 | 1/2007 | Niermeyer et al. |
| 7,222,889 B2 | 5/2007 | Breay |
| 7,296,582 B2 | 11/2007 | Campbell et al. |
| 7,300,483 B2 | 11/2007 | Hauville |
| 7,350,821 B2 | 4/2008 | Campbell et al. |
| 7,387,210 B2 | 6/2008 | Burrows et al. |
| 7,407,148 B2 | 8/2008 | Bassett et al. |
| 7,547,049 B2 | 6/2009 | Gashgaee |
| 7,785,384 B2* | 8/2010 | Schramm ............ F01N 3/021 55/484 |
| 7,963,572 B2 | 6/2011 | Bull et al. |
| 8,017,009 B2 | 9/2011 | Arteche |
| 2002/0163181 A1 | 11/2002 | Russell |
| 2003/0094405 A1 | 5/2003 | Stamey et al. |
| 2003/0217958 A1 | 11/2003 | Reid |
| 2004/0070200 A1 | 4/2004 | Campbell et al. |
| 2004/0207202 A1 | 10/2004 | Parks |
| 2004/0232064 A1 | 11/2004 | Wilkinson et al. |
| 2005/0167352 A1 | 8/2005 | Burrows et al. |
| 2006/0032806 A1 | 2/2006 | Parker |
| 2006/0043021 A1 | 3/2006 | Pesakovich et al. |
| 2006/0191841 A1 | 8/2006 | Kawarabata |
| 2006/0213827 A1 | 9/2006 | Nozaki |
| 2006/0219622 A1 | 10/2006 | Arteche et al. |
| 2006/0254230 A1 | 11/2006 | Powell |
| 2007/0125541 A1 | 6/2007 | Bull et al. |
| 2008/0116688 A1 | 5/2008 | Bull et al. |
| 2008/0169235 A1 | 7/2008 | Goto |
| 2009/0321339 A1 | 12/2009 | Suzuki et al. |
| 2010/0140156 A1 | 6/2010 | Levy et al. |
| 2010/0163163 A1 | 7/2010 | Kawarabata |
| 2010/0304232 A1* | 12/2010 | Huecker ............ B01D 46/0015 429/410 |
| 2011/0011782 A1 | 1/2011 | Myers et al. |
| 2012/0074053 A1 | 3/2012 | Collignon et al. |
| 2013/0154253 A1 | 6/2013 | Yuhara et al. |
| 2013/0161941 A1 | 6/2013 | Zulauf et al. |
| 2014/0091027 A1 | 4/2014 | Laverdiere et al. |
| 2014/0238922 A1 | 8/2014 | Puglia et al. |
| 2015/0247595 A1 | 9/2015 | Laverdiere et al. |
| 2015/0273365 A1 | 10/2015 | Laverdiere et al. |

FOREIGN PATENT DOCUMENTS

| | | |
|---|---|---|
| CN | 102228754 A | 11/2011 |
| CN | 102574065 | 7/2012 |
| CN | 202561304 U | 11/2012 |
| CN | 202612910 U | 12/2012 |
| DE | 2851776 A1 | 6/1980 |
| DE | 7835503 U1 | 7/1981 |
| DE | 10337652 | 3/2005 |
| EP | 0983784 | 3/2000 |
| EP | 1600199 | 11/2005 |
| EP | 1600199 A1 | 11/2005 |
| EP | 1637206 | 3/2006 |
| EP | 2484430 A1 | 8/2012 |
| FR | 2664672 A1 | 1/1992 |
| FR | 2935102 A1 | 2/2010 |
| GB | 771968 | 4/1957 |
| GB | 1152093 | 5/1969 |
| GB | 1392401 | 4/1975 |
| GB | 1510394 | 5/1978 |
| GB | 2082080 | 3/1982 |
| GB | 2086762 A1 | 5/1982 |
| GB | 2485360 | 5/2012 |
| JP | S50-009864 | 1/1975 |
| JP | S521-49466 U | 11/1977 |
| JP | S53-01383 | 5/1978 |
| JP | 55-95743 | 7/1980 |
| JP | S61-291015 | 12/1986 |
| JP | H05-26111 A | 2/1993 |
| JP | H10-85727 A | 4/1998 |
| JP | H11-47519 A | 2/1999 |
| JP | H11-63513 A | 3/1999 |
| JP | 2000-513656 A | 10/2000 |
| JP | 2000-516132 A | 12/2000 |
| JP | 2002-191914 A | 7/2002 |
| JP | 2003-251110 A | 9/2003 |
| JP | 2004353783 A1 | 12/2004 |
| JP | 2006512206 A1 | 4/2006 |
| JP | 2006-516476 A | 7/2006 |
| JP | 2006-517864 A | 8/2006 |
| JP | 2008068162 A1 | 3/2008 |
| JP | 2008115969 A1 | 5/2008 |
| JP | 2008168241 A1 | 7/2008 |
| JP | 2009213984 A1 | 9/2009 |
| JP | 2012-232280 A | 11/2012 |
| JP | 5874123 B2 | 3/2016 |
| WO | 97/33763 A2 | 9/1997 |
| WO | WO1997033673 | 9/1997 |
| WO | 98/05407 A1 | 2/1998 |
| WO | 98/57725 A1 | 12/1998 |
| WO | WO00053285 | 9/2000 |
| WO | WO0147620 | 7/2001 |
| WO | WO2001048413 A1 | 7/2001 |
| WO | WO2001083079 | 11/2001 |
| WO | 2004/069373 A1 | 8/2004 |
| WO | 2004/069376 A2 | 8/2004 |
| WO | 2004084974 A1 | 10/2004 |
| WO | WO2007007898 | 1/2007 |
| WO | WO2007024842 A2 | 3/2007 |
| WO | WO2007149273 | 12/2007 |
| WO | 2008047361 A1 | 4/2008 |
| WO | WO2009022768 | 2/2009 |
| WO | WO2009059324 A2 | 5/2009 |
| WO | WO2009062912 | 5/2009 |
| WO | 2013/052091 A1 | 4/2013 |

(56) References Cited

OTHER PUBLICATIONS

Written Opinion issued for PCT Application No. PCT/US2013/062744, dated Sep. 12, 2014, 4 pages.
International Search Report and Written Opinion issued for PCT Application No. PCT/US2013/062743, dated Sep. 25, 2014, 19 pages.
Written Opinion issued for PCT Application No. PCT/US2013/062745, dated Oct. 15, 2014, 12 pages.
Office Action issued for Chinese Patent Application No. 201280048849.5, dated Nov. 13, 2014, 6 pages.
International Preliminary Report on Patentability issued for PCT Application No. PCT/US2013/062744, dated Dec. 11, 2014, 32 pages.
Office Action issued for U.S. Appl. No. 14/349,623, dated Dec. 19, 2014, 20 pages.
Examination Report issued for Singaporean Patent Application No. 11201401179P, dated Jan. 5, 2015, 11 pages.
Office Action issued for Chinese Patent Application No. CN201280048928.6, dated Dec. 2, 2014, 7 pages.
2nd Written Opinion issued for PCT Application No. PCT/US2013/062743, dated Feb. 16, 2015, 12 pages.
International Preliminary Report on Patentability (IPRP) issued for PCT Application No. PCT/US2013/062745, dated Mar. 30, 2015, 100 pages.
Search Report issued for Singaporean Patent Application No. 11201401180X, dated Feb. 27, 2015, 8 pages.
Written Report issued for Singaporean Patent Application No. 11201401180X, dated Feb. 27, 2015, 11 pages.
International Preliminary Report on Patentability (IPRP) issued for PCT Application No. PCT/US2013/062743, dated Jun. 6, 2015, 90 pages.
Office Action issued for Chinese Patent Application No. 201280048849.5, dated Jun. 15, 2015, 12 pages.
Final Office Action issued for U.S. Appl. No. 14/349,623, dated Jul. 15, 2015, 21 pages.
Office Action issued for Chinese Patent Application No. 201280048928.6, dated Sep. 7, 2015, 18 pages.
Final Examination Report (Notice of Allowance) issued for Singaporean Patent Application No. 11201401180X, dated Nov. 24, 2015, 14 pgs.
Chinese Patent Application No. 201280048849.5, dated Dec. 10, 2015, 11 pages.
Corrected International Preliminary Report on Patentability issued for PCT Application No. PCT/US2012/000427, dated Dec. 14, 2015, 37 pages.
Office Action issued for U.S. Appl. No. 14/349,623, dated Dec. 14, 2015, 26 pages.
Office Action issued for Chinese Patent Application No. 201380062532.1, dated Dec. 16, 2015, 21 pages.
Office Action issued for U.S. Appl. No. 14/432,741, dated Jan. 13, 2016, 14 pages.
Office Action issued for Chinese Patent Application No. 201280048928.6, dated Feb. 1, 2016, 15 pages.
Office Action issued for Chinese Patent Application No. 201380062389.6, dated Feb. 1, 2016, 14 pages.
Written Opinion issued for Singaporean Patent Application No. 11201502550Y, dated May 19, 2016, 9 pages.
Written Opinion issued for Singaporean Patent Application No. 11201502555Q, dated Jun. 3, 2016, 9 pages.
Notice of Allowance issued for U.S. Appl. No. 14/432,741, dated Jun. 6, 2016, 7 pages.
Final Office Action issued for U.S. Appl. No. 14/349,623, dated Jun. 14, 2016, 25 pages.
Notice of Allowance issued for Chinese Patent Application No. 201280048849.5, dated Jul. 5, 2016, 2 pages.
ZeeWeed1000 Ultrafiltration Membrane, GE Water Product Information, 3 pgs., GE Water & Process Technologies, Trevose, PA, US, accessed Oct. 3, 2011 at http://www.gewater.com/products/equipment/mf_uf_mbr/zeeweed_1000.jsp.
Purifier Design History, Feb. 19, 2007, 13 pgs., Entegris, Inc., Billerica, MA.
International Search Report and Written Opinion of the International Searching Authority for International Application No. PCT/US2012/000427, dated Dec. 19, 2012, 12 pgs.
International Search Report and Written Opinion of the International Searching Authority for International Application No. PCT/US2012/000437, dated Dec. 21, 2013, 14 pgs.
Second Written Opinion of the International Preliminary Examining Authority for International Application No. PCT/US2012/000427, dated Sep. 30, 2013, 11 pgs.
Second Written Opinion of the International Preliminary Examining Authority for International Application No. PCT/US2012/000437, dated Dec. 21, 2013, 14 pgs.
International Search Report and Written Opinion of the International Searching Authority for International Patent Application No. PCT/US2013/062744, dated Dec. 3, 2013, 11 pgs.
Partial International Search for International Patent Application No. PCT/US2013/062743, dated Jan. 23, 2014, 3 pgs., Patent Cooperation Treaty.
Partial International Search for International Patent Application No. PCT/US2013/062745, dated Jan. 23, 2014, 3 pgs., Patent Cooperation Treaty.
International Preliminary Report on Patentability for International Application No. PCT/US2012/000427, dated Feb. 12, 2014, 69 pgs., Patent Cooperation Treaty.
International Preliminary Report on Patentability for International Application No. PCT/US2012/000437, dated Feb. 12, 2014, 45 pgs. Patent Cooperation Treaty.
Translation of Office Action issued for Japan Patent Application No. 2014-534531 dated Sep. 5, 2016, 6 pages.

\* cited by examiner

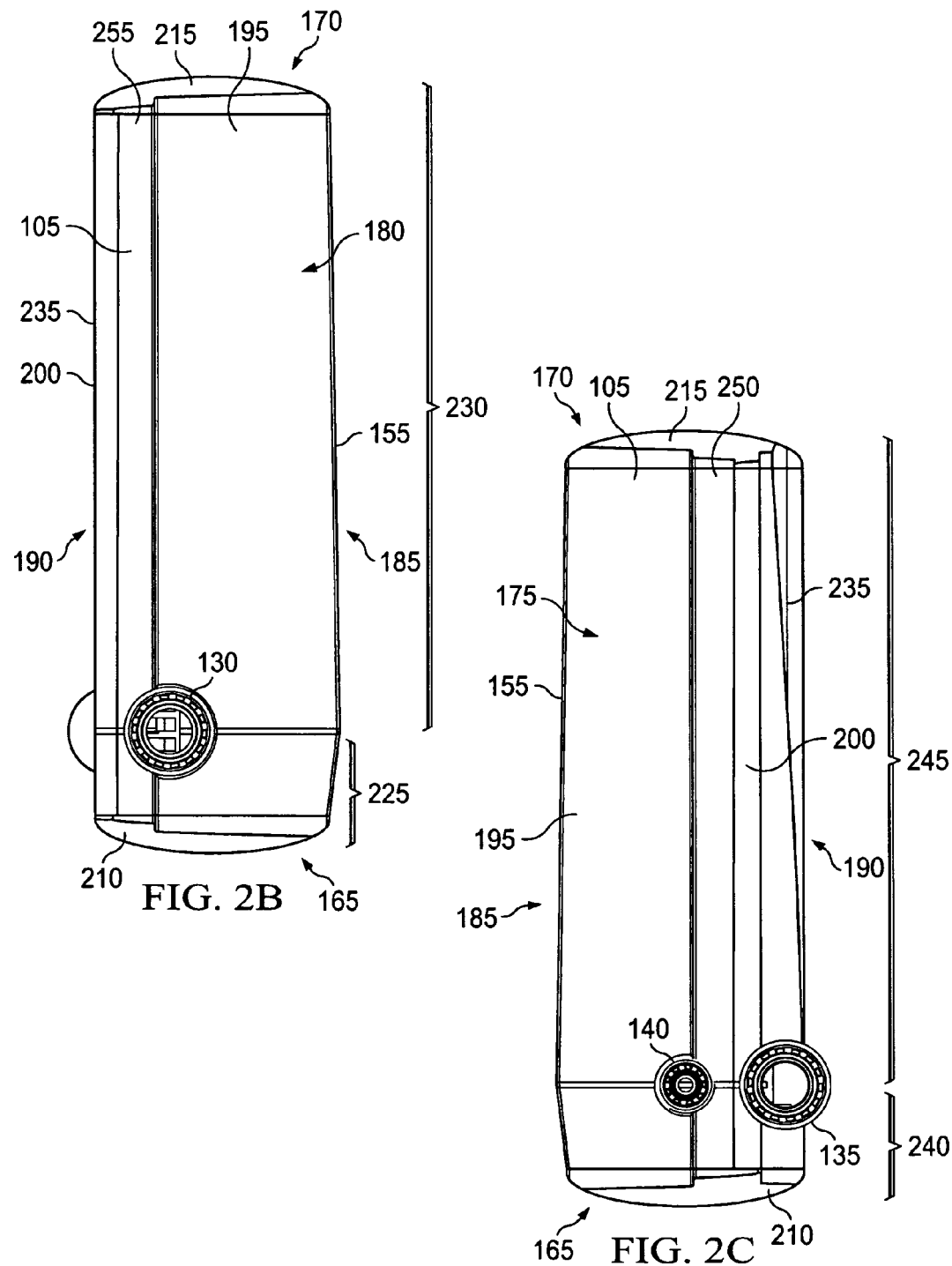

MODULAR FILTER CASSETTE

CROSS-REFERENCE TO RELATED APPLICATIONS

This is a national stage application of International Application No. PCT/US2012/000427 filed Oct. 3, 2012, entitled "MODULAR FILTER CASSETTE," and claims the benefit of U.S. Provisional Patent Application No. 61/542,645, entitled "Modular Filtration System," filed Oct. 3, 2011 and U.S. Provisional Patent Application No. 61/613,886, entitled "Modular Filtration System," filed Mar. 21, 2012, all of which are hereby fully incorporated by reference herein.

TECHNICAL FIELD

This disclosure relates to filtration systems. More particularly, embodiments described herein relate to modular filtration systems. Even more particularly, embodiments described herein relate to modular filtration systems for filtering semiconductor manufacturing fluids.

BACKGROUND

Semiconductor manufacturing processes are highly sensitive to contamination because depositing even a tiny particle on a semiconductor wafer can lead to defects. Therefore, it is common to employ ultraclean filters having membranes that remove submicron particles. Although different filtration modules have been developed to filter semiconductor manufacturing liquids, many existing filter modules are cylindrical, having a housing with a one-piece cylindrical bowl or sleeve in which the filter membrane resides. Typically, these filters contain a circular pleated filter membrane that encircles a hollow core. Fluid enters the filter module from the top, flowing between the filter membrane and the housing, passes through the filter membrane to the hollow core and exits the module out the top.

Existing cylindrical filter modules suffer several shortcomings. One deficiency is that the circular pleated membrane unduly restricts fluid flow because the membrane must be more tightly packed towards the center in order to achieve the circular configuration. Another deficiency is that the cylindrical housings are molded or extruded as single pieces, making it difficult or Impossible to add geometries that run perpendicular to the cylinder's axis. Furthermore, many existing filter modules are difficult to install and replace. Since many liquids used in semiconductor manufacturing ere corrosive or toxic, filter module replacement presents a danger to workers.

Current filtration systems that employ cylindrical filters have limited configurability. In many cases, filters are connected through multiple units in a fixed configuration, making it difficult to change the flow through the filters from serial to parallel as needed. Additionally, many filtration systems use only a single type of filter, limiting the ability to apply different filters for different purposes or particle sizes in a single filtration system.

SUMMARY

This disclosure relates to filtration systems and filters. Particular embodiments provide filtration systems and filters for filtering semiconductor manufacturing liquids.

According to one embodiment, a filter assembly may include a rectangular filter element without a filter cage or core (non-cylindrical). The filter element may include a relatively flimsy membrane constrained directly by the main shell. A membrane cover may hold the membrane in place. The four sides of a filter housing may be bonded or otherwise coupled together to fully encapsulate the filter element.

A filter cassette can comprise a filter housing having a filter inlet defining an inlet flow path and a filter outlet spaced from the filter inlet defining en outlet flow path. The filter housing may define a filter cavity comprising an upstream portion of the filter cavity in fluid communication with the inlet and a downstream portion of the filter cavity in fluid communication with the outlet. The filter element may further comprise a filter element disposed in the filter cavity. The filter element may at least partially overlap the filter inlet on a first side of the filter element. The filter element may separate the upstream portion of the filter cavity from the downstream portion of the filter cavity by a potting material. The filter element may comprise a rectangular pleated filter with a set of pleats having a first set of pleat tips on an upstream side of the filter element and a second set of pleat tips on a downstream side of the pleated filter. The first set of pleat tips form a generally planar rectangular entrance interface with the upstream portion of the filter cavity. The second set of pleat tips may form a generally planar rectangular exit interface with the downstream portion of the filter cavity. The filter element may be disposed in a shifted parallelogram filter holding area.

The filter cassette may include a flow guide disposed between the inlet and the filter element, the flow guide configured to direct flow from the inlet to an upstream sidewall. The filter cassette may further include a filter cover at least partially defining the filter element holding area. A first membrane flap and a second membrane flap of the filter element may be retained between the filter cover and the filter housing. Potting may seal a first end of the filter element and second end of the filter element.

The filter cavity may be at least partially defined by an upstream sidewall, a downstream sidewall spaced from the upstream sidewall, a third wall running from the upstream sidewall to the downstream sidewall, and a fourth wall running from the upstream sidewall to the downstream sidewall and spaced from the third wall. The filter element can be shifted toward the upstream sidewall such that a distance between the filter element and the upstream sidewall decreases in a direction from the third wall to the fourth wall. The filter inlet may interface with the filter cavity at the third wall and the outlet may interface with the filter cavity at the fourth wall. The filter cavity may be further defined by a fifth wall and a sixth wall. The inlet can interface with the filter cavity at the fifth wall and the outlet can interface with the filter cavity at the sixth wall.

The upstream portion of the filter cavity may be shaped such that the upstream portion of the filter cavity has a decreasing hydraulic diameter away from the filter inlet and the downstream portion of the filter cavity is shaped to have an increasing hydraulic diameter toward the outlet.

Another embodiment may include a filter housing having a filter inlet defining a vertical inlet flow path and a filter outlet spaced from the filter inlet, the filter outlet defining a vertical outlet flow path. The filter housing may comprise an upstream sidewall and a downstream sidewall and define a filter cavity having an upstream portion in fluid communication with the filter inlet and a downstream portion in fluid communication with the outlet. A filter element may be disposed in the filter cavity. The filter element may be potted and separate the upstream portion of the filter cavity from the downstream portion of the filter. The filter element may comprise a rectangular pleated filter with a set of pleats having a first set of pleat tips on an upstream side of the filter element and a second set of pleat tips on a downstream side of the filter element. The pleated filter disposed in a shifted parallelogram filter holding area. One embodiment can further include a flow guide to direct flow from the inlet to the upstream sidewall. The pleated filter itself may act as the flow guide or the flow guide may be disposed between the filter element and the inlet.

Yet another embodiment may comprise a method for filtering a liquid. The method may include receiving liquid into an upstream portion of a filter cavity through an inlet defining an inlet flow path in a first direction. The method may further include redirecting the liquid in a second direction to an upstream sidewall on an upstream side of a filter element using a flow guide. The method may further include wetting a filter element that comprises a pleated filter with a set of pleats having a first set of pleat tips on an upstream side of the filter element and a second set of pleat tips on a downstream side of the filter element. The fluid can be directed through the filter element to a downstream portion of the filter cavity to provide normal flow filtration and to an outlet fluidly coupled to the upstream portion of the filter cavity.

Another embodiment can include a filter housing having an inlet defining a vertical inlet flow path and en outlet spaced from the inlet defining a vertical outlet flow path. The filter housing can comprise an upstream sidewall and a downstream sidewall and can define a filter cavity having an upstream portion in fluid communication with the inlet and a downstream portion in fluid communication with the outlet. The upstream portion of the filter cavity comprising a first portion adjacent to the upstream sidewall and a second portion fluidically coupling the inlet to the first portion of the upstream portion. A filter element may be disposed in the filter cavity at least partially overlapping the inlet on a first side of the filter element. The filter element may separate the upstream portion of the filter cavity from the downstream portion of the filter cavity. The filter element further comprising a pleated filter with a set of pleats having a first set of pleat tips on an upstream side of the filter element and a second set of pleat tips on a downstream side of the filter element, wherein the first set of pleat tips form a generally planar rectangular entrance interface with the upstream portion of the filter cavity.

Embodiments described herein can reduce or eliminate problems associated with round filters by utilizing a rectangular pleat pack. For rectangular pleat packs, the pleat pack density remains uniform through the device, maximizing the effectiveness of the filtration area. For devices with the same filtration area, a rectangular pleat pack will perform as if it has more filtration area than a round pleated membrane.

As another advantage, a rectangular shaped pleat pack generally allows for taller pleats than that of a round filter cartridge. Therefore, the a rectangular pleat pack can better fill a volume and provide a more uniform shape than a round pleat pack, thereby reducing the envelope dimensions for a rectangular pleat pack device.

As another advantage, one embodiment described herein provides a housing that is split along the length of the device (running in the same direction as the pleats), allowing for geometry, such as ribs (with flow spaces), to be created perpendicular to the pleat direction. This provides the pleat pack support directly in the shell/housing, eliminating the need to have a separate cage to support the outside geometry of the pleat pack.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIGS. 2A-2C are diagrammatic representations of one embodiment of a filter assembly arranged as a filter cassette;

DETAILED DESCRIPTION

Figure 1:
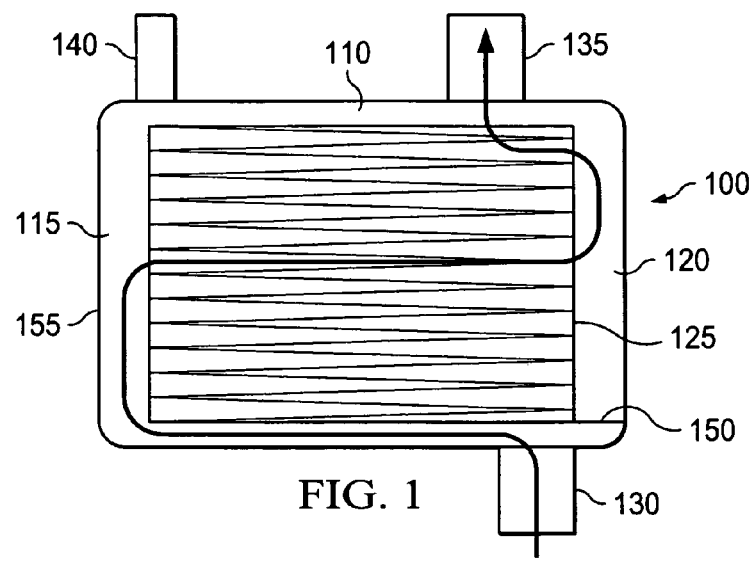
FIG. 1 is a diagrammatic representation of one embodiment of a filter assembly.

Filters and filtration systems and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying concept will become apparent to those skilled in the art from this disclosure.

Embodiments described herein relate to filtration systems for the filtration of liquids. In particular, embodiments described herein provide filtration systems for filtering semiconductor process fluids including chemicals used in wet etch and cleaning applications. For example, embodiments can be applied to filtering chemicals in photolithographic processing (photochemicals). Photochemicals include materials such as primers, adhesion promoters, photoresists, edge bead removers, anti-reflective coatings, developers, dielectrics, and the like. The chemicals can be filtered at the point of use (POU), the subfloor or elsewhere.

According to one embodiment, a filtration system can use one or more non-cylindrical removable filter cassettes having inlet ports, outlet ports and vent ports as needed. A main assembly provides fluid flow paths for fluid feed into and out of the filter cassette. The fluid flow paths of the filtration system can be reconfigurable so that fluid can be provided to the filter cassettes in different manners (e.g., in parallel, in serial or a combination thereof). The filter cassettes may be installed and removed in manner that reduces or eliminates dripping of chemicals using vertical motion or a tip/tilt mechanism.

According to one embodiment, the filter may engage with the main assembly using O-ring-less fittings and fitting assemblies as described in U.S. Pat. No. 7,547,049 entitled "O-Ring-Less Low Profile Fittings and Fitting Assemblies" by Gashgaee et al., issued Jun. 16, 2009, which is hereby fully incorporated by reference herein, or other connection mechanism. In other embodiments, the filters may use a connection mechanism such that ports can connect through rotation such as described in U.S. Pat. No. 6,378,907, entitled "Connector Apparatus and System Including Connector Apparatus" issued Apr. 30, 2002, U.S. Pat. No. 7,021,667, entitled "Connector Apparatus and System Including Connector Apparatus" issued Apr. 4, 2006, U.S. Pat. No. 7,296,582, entitled "Method and System for Purging a Dispensed Fluid Within a Fluid Dispensing System Including a Filter-Free Connector Apparatus," issued Nov. 20, 2007, U.S. Pat. No. 7,350,821, entitled "Method and System for Purging a Dispensed Fluid with a Fluid Dispensing System Including A Filter-Free connector Apparatus," issued Apr. 1, 2008, U.S. Pat. No. 7,037,424 entitled "Connector Apparatus and System Including Connector Apparatus," issued May 2, 2006, each of which is hereby fully incorporated by reference herein.

The filter cassettes may be configured to provide normal flow filtration (NFF), in which fluid is convected directly toward the filter membrane under applied pressure. Particles that are too large to pass through the pores of the membrane accumulate at the membrane surface or in the depth of the filtration media, while small molecules pass through membrane pores to the downstream side. According to one embodiment, the filter cassettes can be selected to remove micron and/or submicron particles (e.g., including particles of 100 nm or less). Multiple filters may be applied in series in a single filtration system unit to successively remove smaller particles or different types of particles. The finest filter can be placed last in series so that larger particles are filtered out prior to reaching the last filter. This can reduce wear on the finest, typically most expensive, filter.

In one embodiment, the filter cassettes use non-circular pleated filter elements. For example, one embodiment may include a rectangular pleated filter with a first set of pleat tips facing the upstream portion of the filter cavity and a second set of pleat tips facing the downstream portion of the filter cavity. The first set of pleat tips may be generally arranged in a first plane and the second set of pleat tips may be generally arranged in a second plane. According to one embodiment the filter element may provide a generally planar rectangular entrance interface and a generally planar rectangular exit interface. The use of rectangular pleat packs can provide significant additional filtration in same footprint as traditional semiconductor liquid filters.

FIG. 1 is a diagrammatic representation of one embodiment of a filter assembly 100 having a filter housing 105 defining a filter cavity 110 divided into an upstream portion 115 and downstream portion 120 by a filter element 125 disposed in the filter cavity 110. Filter element 125 can be any suitable filter media including, but not limited to pleated filters, depth filters, hollow fiber membranes, or other filters. In one embodiment, filter element 125 comprises a rectangular pleat pack. The pleats of the filter can be formed from a single membrane or multiple membranes formed from the same or different materials. Additionally, polymeric netting materials and other materials may be pleated with the membrane.

A filter inlet port 130 is located upstream of filter element 125 and a filter outlet port 135 is located downstream of filter element 125 (from a fluid flow perspective running through the filter). Filter vent ports (e.g., filter vent port 140) can be located upstream and/or downstream of filter element 125. According to one embodiment, filter inlet port 130 defines an upwardly vertical inlet flow path, filter outlet port 135 defines an upwardly vertical outlet flow path and filter vent port 140 defines an upwardly vertical vent flow path. Preferably, filter vent port 140 is open to the upstream portion 115 of the filter cavity at the highest point possible so that any gas in upstream portion 115 naturally rises to filter vent port 140. Similarly, an outlet vent port can be provided that preferably is open to the downstream portion 120 of the filter cavity at the highest point possible so that any gas in downstream portion 120 naturally rises to vent port 140. If a downstream vent port is not provided, it may be preferable to have the outlet port at the highest possible location so that all air on the outlet side is purged at startup and does not reside or collect in the filter. Vent ports can be fluidly coupled to valves.

The vent ports (or corresponding ports in the manifold) may be pressure actuated with an actuation pressure that is greater than the driving pressure of the fluid. Manual valves can also be used. For example, the filter or manifold can include valves, such as poppet valves or other valves so that gas is only vented when it exceeds a particular pressure (e.g., 5 psi above the expected operating pressure of filter assembly 100) or volume. The ports can comprise Connectology connections from Entegris, Inc. of Billerica, Mass., Swagelok fittings or other connection capable of fluidic sealing.

To efficiently place ports in a footprint, a pleated area of filter element 125 may overlap filter inlet port 130, filter outlet port 135 and/or filter vent port(s) 140. However, if the flow of fluid entering the filter assembly 100 is sufficient, fluid flow directly impacting filter element 125 may damage it. Accordingly, a flow guide 150 (e.g., a baffle, tubing or other flow directing structure) disposed between filter element 125 and the inlet can obstruct flow along the axis of the inlet and redirect flow toward upstream sidewall 155. While flow guide 150 is illustrated as extending generally perpendicular to the axis of filter inlet port 130, flow guide 150 may be arranged at other angles. In other embodiments, the flow may be low enough or filter element 125 durable enough to direct flow to upstream sidewall 155 without flow guide 150.

The interior surfaces of filter cavity 110 can be formed of a material that is more phobic or philic relative to the material of filter element 125. In one embodiment, filter housing 105 can be formed of a material such that sidewall 155 is more philic to gas than filter element 125—or, put another way, filter element 125 can be selected to be more phobic to gas than the housing material—to promote affinity of gas to sidewall 155. By way of example, but not limitation, the difference in surface energy between the housing material and filter element 125 can be greater than 10 dynes/cm$^2$. Thus, there may be a surface energy gradient between filter element 125 and sidewall 155. Consequently, as fluid washes over sidewall 155 and fills upstream portion 115, gas in the fluid will be attracted to sidewall 155. The gas is therefore more likely to rise to filter vent port 140 rather than pass through filter element 125. A similar phenomenon can occur in downstream portion 120.

In operation, filter assembly 100 provides normal, flow filtration (NFF). Fluid enters filter inlet port 130 in a generally upward direction and is directed to an upstream sidewall 155 of the filter cavity. As pressure increases in upstream portion 115, the fluid flows through filter element 125 to downstream portion 120. The primary flow path of fluid through filter element 125, in one embodiment, can be generally perpendicular to the flow path through filter inlet port 130. Filter cavity 110 can be configured to promote uniform or near uniform flow throughout the device to fully sweep the filter (e.g., to minimize or eliminate dead space) and minimize the pressure loss effects.

According to one embodiment, filter cavity 110 can be shaped to maintain the ratio of fluid volume to hydraulic diameter (hydraulic diameter is a term known in the art when addressing flow in noncircular tubes and channels and is defined by $D_H=4A/P$, where A is cross-sectional area and P is wetted perimeter of the cross section) in upstream portion 115 and/or downstream portion 120. In another embodiment, the ratio is not maintained, but hydraulic diameter does increase for areas of increased fluid volume. In other embodiments, the hydraulic diameter of upstream portion 115 and/or downstream portion 120 remains constant. Preferably, the hydraulic diameter of upstream portion 115 proximate to filter inlet port 130 is greater than or equal to the hydraulic diameter of filter inlet port 130. Furthermore, upstream portion 115 is preferably shaped so that the hydraulic diameter of upstream portion 115 decreases away from filter inlet port 130. Similarly, it is preferable that the hydraulic diameter of downstream portion 120 gradually increases to be equal or greater than to the hydraulic diameter of filter outlet port 135. In general, the filter housing can be designed so that the filter housing is not a restricting factor such that fluid flows through the filter with less loss than through the fittings.

Figure 2A:
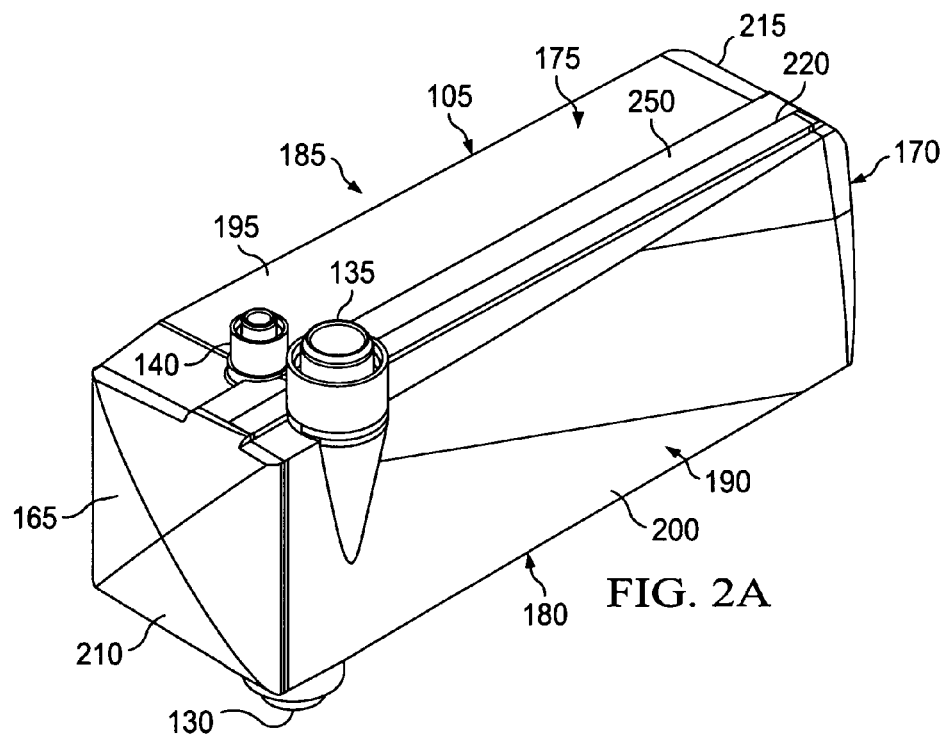

FIGS. 2A-2C are diagrammatic representations one embodiment of a filter assembly arranged as a non-cylindrical filter cassette. For purposes of explanation, the filter cassette has a first end 165 (referred to as the "front"), a second and (referred to as the "back") 170, a top 175, a bottom 186, a first side 185 and a second side 190. In the embodiment illustrated, the long axis of the filter assembly is a horizontal axis running from first end 165 to second end 170.

Filter housing 105 may be comprised of multiple housing portions. In FIGS. 2A-2C, for example, housing 105 is formed by a main shell 195, a side cover 200, front end cover 210 and back end cover 215. The various portions of filter housing 105 may be joined by sonic bonding, welding, adhesive, mechanical fasteners or according to any suitable coupling scheme. According to one embodiment, a main bonding seam 220 of the filter housing runs from the front to the back of filter housing 105 along the long axis.

FIGS. 2A-C further illustrate filter inlet port 130 on the bottom of the housing 105, filter outlet port 135 on top of housing 105 and filter vent port 140 on the top of filter housing 105 toward the front end 165. According to one embodiment, the various ports can be located as far to the front of the filter cassette as possible while still allowing for bonding between the components. In other embodiments the ports may be otherwise arranged (e.g., with one or more ports near the center or back end of the filter cassette). The centerlines of the openings for ports 130 and 135 can be located at the widest portion of the cassette in one embodiment. From a fluid flow perspective within the cassette, opening for filter inlet port 130 can be located at the lowest point of the filter cavity and the openings for ports 135 and 140 can be located at the highest point of the filter cavity.

With reference to FIGS. 2B-2C, it is assumed that the shape of the interior cavity roughly follows the shape of the exterior of the filter cassette. The shape of the cassette can be selected so that the width and/or height of the upstream and downstream portions of the interior cavity decrease away from the respective ports. A section of the upstream portion of the interior cavity to the front of filter inlet port 130 (the "front section" of the upstream portion (indicate indicated at 225)) may decrease in height and/or width because sidewall 155 tapers inward and/or the top wall tapers downward and/or the bottom wall tapers upward from back to front in section 225. A section of the upstream portion of the interior cavity to the back of the inlet port (the "back section" of the upstream portion (indicated at 230)) may also decrease in height and/or width away from filter inlet port 130 because sidewall 155 tapers inward and/or the top wall tapers downward and/or the bottom wall tapers upward from front to back in back section 230. Consequently, the hydraulic diameter of the upstream portion of the filter cavity decreases away from filter inlet port 130. Similarly, a section of the downstream portion of the interior cavity to the front of the outlet port (the "front sections" of the downstream portion (indicated at 240)) may decrease in height and/or width because downstream sidewall 235 tapers inward and/or the top wall tapers downward and/or the bottom wall tapers upward from filter outlet port 135 to the front in section 240. A section of the downstream portion of the interior cavity to the back of the inlet port (the "back section" of the downstream portion (indicated at 245)) may also decrease in height and/or width away from filter outlet port 136 because wall 235 tapers inward and/or the top tapers downward and/or the bottom tapers upward from front to back at back section 245. Thus, the hydraulic diameter of the downstream portion of the filter cavity can increase toward filter outlet port 135.

Also illustrated in FIG. 2B-2C, filter housing 105 may include optionally include features to aid in bonding or otherwise assembling the filter housing 105. By way of example, but not limitation, filter housing 105 may include features, such as feature 250 extending from the top surface and feature 255 extending from the bottom surface to provide additional area for capturing the filter cover and filter membrane (discussed below). These features may also aid in, alignment and act as guide rails for aligning the cassette in a system that receives the cassette. Other or alterative alignment features may also be provided for inserting the filter assembly into a filtration system.

Figure 3:
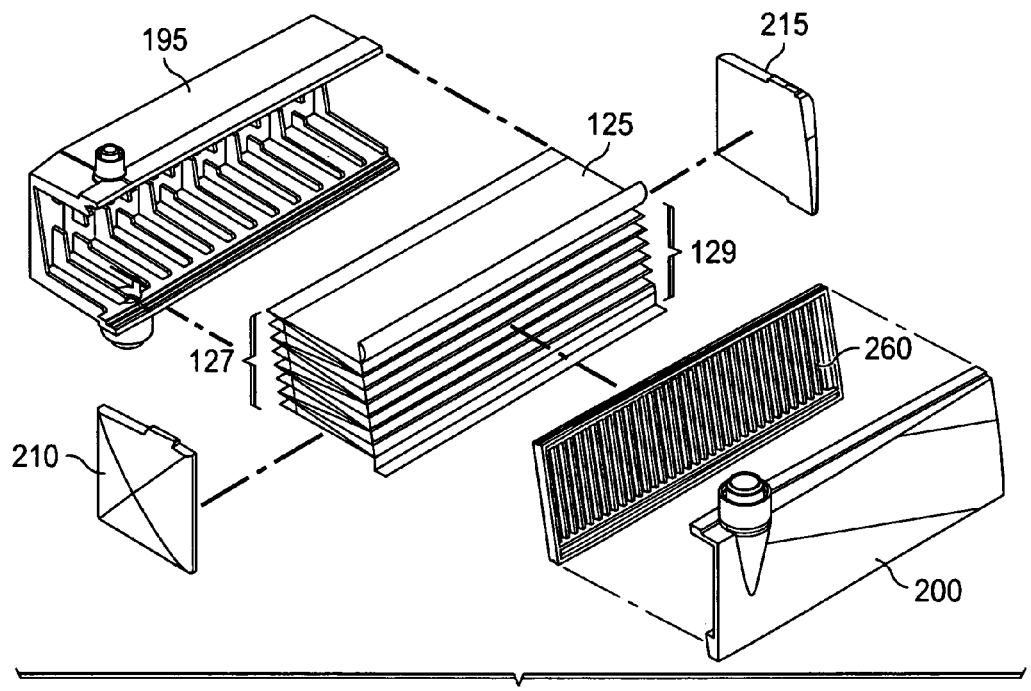
FIG. 3 is an exploded view of one embodiment of a filter assembly.

FIG. 3 is an exploded view of one embodiment of a filter assembly. Main shell 195, side cover 200, front end cover 210 and rear end cover 215 form a filter housing with an interior cavity in which filter element 125 is disposed. A filter cover 260 is coupled to the housing to retain filter element 125 in place when fluid pressure is applied.

Filter element 125, in the embodiment of FIG. 3, is a rectangular pleat pack in which the filter membrane is pleated parallel to the long axis of the filter housing. The pleat pack includes a first set of pleat tips 127 that face the upstream portion of the filter cavity and a second set of pleat tips 129 that face the downstream portion of the filter cavity. The first set of pleat tips are generally arranged in an upstream plane and the second set of pleat tips are generally arranged in a downstream, plane. The pleat pack forms a generally rectangular interface with the upstream portion of the filter cavity and a generally rectangular interface with the downstream portion of the filter cavity.

FIGS. 4A-40 are diagrammatic representations of one embodiment of main shell 195. Main shell 195 may include a top wall portion 270, a bottom wall portion 275 and a sidewall 155 running from a first end of main shell 195 to a second end of main shell 195. According to one embodiment, top wall portion 270 and bottom wall portion 275 both run the length of sidewall 155. Bottom wall portion 275 extends further than top wall portion 270 as measured along an axis perpendicular to sidewall 155 (e.g., with reference to FIG. 2A, bottom wall portion 275 extends further from first side 185 toward second side 190 than top wall portion 270) (though the bottom wall portion 275 and top wall portion 270 may extend at angles other than perpendicular to sidewall 155).

Top wall portion 270 and bottom wall portion 275 may slope relative to multiple axes. For example, top wall portion 270 may be angled relative to two axes: downward from filter vent port 140 to the back end of main shell 195 and upward from sidewall 155 to edge 277. Bottom wall portion 275 may slope upward from filter inlet port 130 to the back end such that the height of the main shell 195 is greater at filter vent port 140 than at the back end. Bottom wall portion 276 may also slope downward from sidewall 155 to edge 279.

Main shell 195 may include a number of ribs. In the example illustrated, main shell 195 includes end ribs $280_1$ and $280_2$, bottom ribs $200_1$-$290_n$, top ribs $295_1$-$295_n$ and intermediate ribs $300_1$-$300_n$. Each rib may include one or more of a bottom offset portion, a sidewall offset portion and a top offset portion. Ribs 290, for example, may be generally L shaped with a bottom offset portion 305 extending a first height from bottom wall portion 275 and a sidewall offset portion 310 along sidewall 155 extending a second height greater than the first height. In one embodiment, the bottom offset portion 305 extends across the bottom of the interior cavity from wall 155 a first distance perpendicular (or et another angle) to the length of the interior cavity and the sidewall offset portion 310 extends from sidewall 155 into the interior cavity a distance that is less than that of bottom offset portion 305. Bottom offset portion 305 may act as a membrane standoff from the bottom surface of the interior cavity and sidewall offset portion 31D may as a pleat standoff from sidewall 155. Sidewall offset portion 310 may be tapered such that the distance sidewall offset portion 310 extends away from sidewall 155 decreases toward the top, thereby reducing the area of the upstream portion of the interior cavity from bottom to top.

Top ribs 295 may also be generally L shaped with a top offset portion 315 extending a first depth from top wall portion 270 and a sidewall offset portion 320 proximate to sidewall 155 extending a second depth, greater than the first depth. In one embodiment, top offset portion 315 extends from sidewall 155 across the top of the interior cavity a first distance perpendicular (or at another angle) to the length of the interior cavity and sidewall offset portion 320 extends from sidewall 155 into the interior cavity a distance that is less than that of the top offset portion 315. Top offset portion 315 may act as a membrane standoff from the top surface of the Interior cavity and sidewall offset portion 320 may act as a pleat standoff from sidewall 155. Sidewall offset portion 320 may be tapered such that the distance sidewall offset portion 320 extends away from sidewall 155 decreases toward the top.

According to one embodiment, the height of bottom ribs 290 is selected so that the upper edges of bottom offset portions 305 are level with each other when the filter cassette is installed. The top ends sidewall offset portions 310 of alternating bottom ribs may also level with each other when the filter cassette is in a fully installed position (e.g., with filter inlet port 130 aligned vertically). For example, the upper edges of bottom offset portions 305 of ribs 290 lie in a first plane, the upper edges of sidewall offset portions 310 of a first set of alternating bottom ribs 290 lie in a second plane and the upper edges of sidewall offset portions 310 of a second set of alternating bottom ribs 290 lie in a third plane. Thus, when the filter is installed, the tops of the bottom offset portions 305 of each rib $290_1$ through $290_n$ will be at the same fluid level, the tops of the sidewall offset portions 310 of the first set of alternating bottom ribs 290 (e.g., ribs $290_2$, $290_4$, etc.) will be at the same fluid level as each other and the tops of the sidewall offset portions 310 of a second set of bottom ribs (e.g., ribs $290_3$, $290_5$, etc.) will be at the same fluid level as each other.

Similarly, the lower edges of top offset portions 315 of alternating top ribs 295 can be level with each other and the lower edges of sidewall offset portions 320 of alternating top ribs 295 may also be level with each other when the filter cassette is installed. For example, the lower edge of top offset portions 315 of ribs 295 may lie in a fourth plane, the lower edges of sidewall offset portions 320 of a first set of top ribs 295 may lie in a fifth plane and the lower edges of sidewall offset portions 320 of a second set of alternating top ribs may lie in a sixth plane. The first, second, third, fourth, fifth and sixth planes can be parallel horizontal planes when the filter cassette is in a full installed, operating position (e.g., with the filter inlet port 130 aligned vertically). In other embodiments the ribs may be otherwise spaced and/or aligned in various planes to provide filter support and housing strength and to minimize flow/pressure loss.

Main shell 195 may further comprise a set of intermediate ribs $300_1$-$300_n$ aligned with alternating top and bottom ribs and projecting inward from sidewall 155 to provide sidewall offsets. The distance that intermediate ribs 300 project inward may decrease along the rib from bottom to top. Alternating top ribs 295 and bottom ribs 280 may be vertically aligned with intermediate ribs 300. According to one embodiment, the length of an intermediate rib 300 is selected so that the top end of the intermediate rib overlaps sidewall offset portions 320 of adjacent alternating top ribs 295 and the lower end of the intermediate rib overlaps sidewall offset portion 310 of adjacent alternating bottom ribs 290. For example, the top end of rib $300_1$ overlaps sidewall offset portions 320 of ribs $295_1$ and $295_3$ and the lower end of rib $300_1$ overlaps the tops of sidewall offset portions 310 of bottom ribs $290_1$ and $290_3$. In other words, the vertical length of the intermediate rib, in one embodiment, is greater than the vertical distance between the second and fifth planes illustrated in FIG. 4B.

The spaces between adjacent ribs form flow channels in cooperation with the bottom of the filter element (or flow guide 150 (not shown)). For example, the area between adjacent ribs 290$_1$ and 290$_2$ forms flow channel 325$_2$ open to the filter inlet. When the filter element is in place and fluid is introduced into the filter cavity, the fluid will follow the flow channels. In the example shown, fluid will fill flow channel 325$_2$ along the bottom of the interior cavity and then follow flow channel 325$_2$ up sidewall 155 until it overtops rib 290$_2$, at which point the fluid will flow into adjacent channel 325$_3$. Fluid will continue to fill channels 325$_2$ and 325$_3$ until the fluid overlops ribs 290$_1$ and 290$_3$ to begin to fill flow channels 325$_1$ and 325$_4$. This process can continue until fluid fills channel 325$_n$. The rib configuration helps ensure that fluid weaves along sidewall 155 increasing the likelihood that gas bubbles will be attracted to sidewall 155 and flow upwards. Furthermore, the rib configuration helps distribute fluid along the length of sidewall 155 to promote even wetting of the filter element.

Figure 4A:
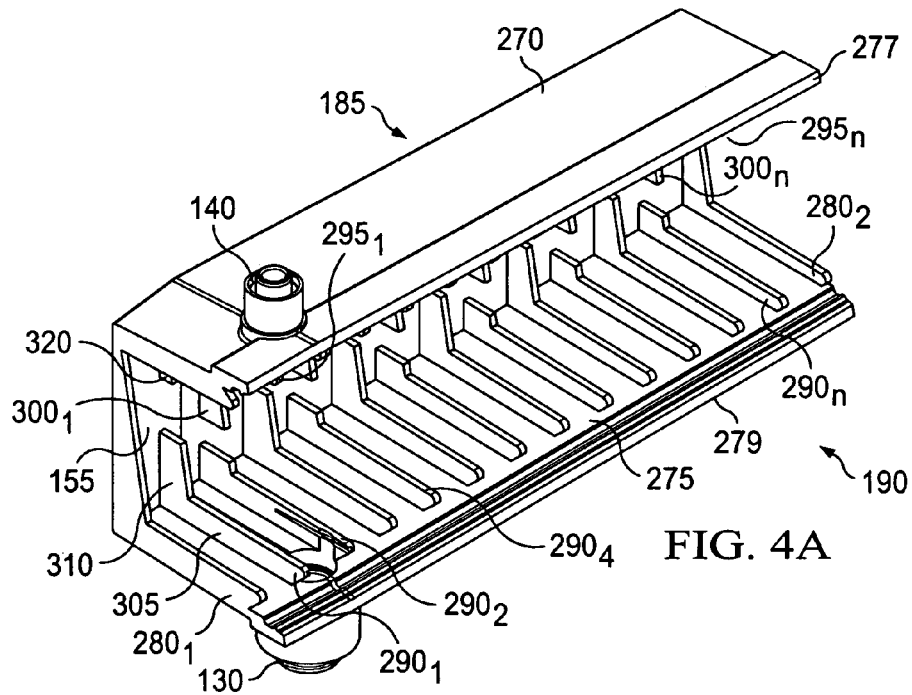
FIGS. 4A-C are diagrammatic representations of one embodiment of a main shell housing portion.
Figure 4B:
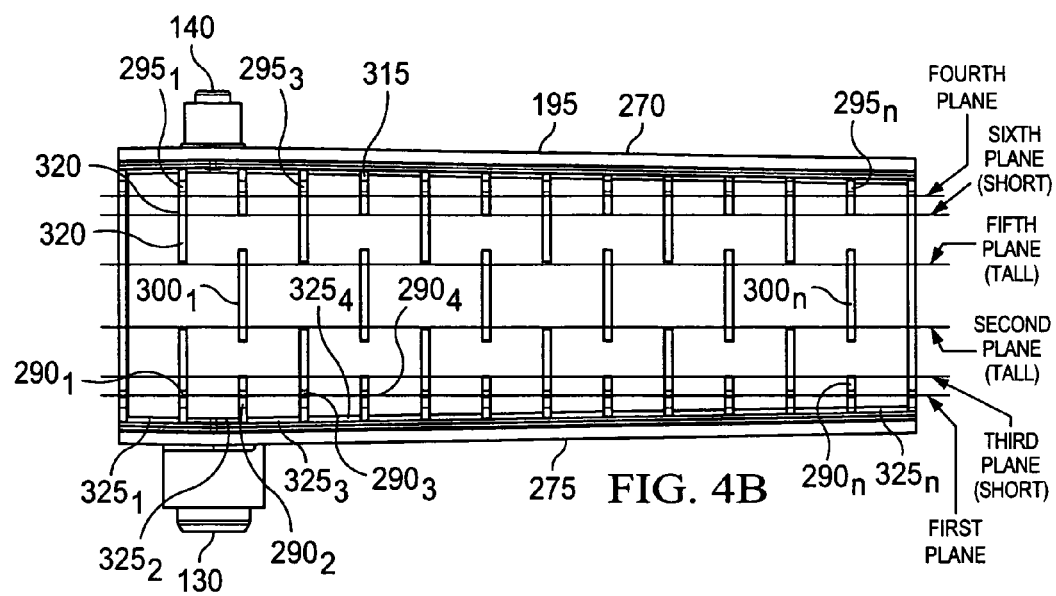
Figure 4C:
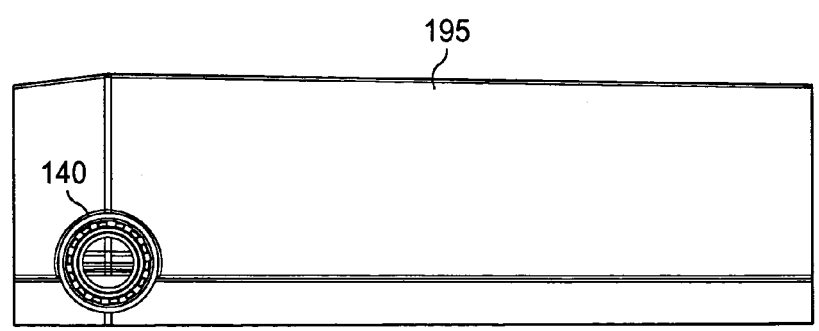

FIG. 4B further illustrates that top portion 270 and bottom portion 275 may taper toward each other away from filter inlet port 130. FIG. 4C further illustrates that, main shell 195 can be shaped so that the filter cassette, or at least the upstream portion of the filter cavity, is widest at the centerline of filter vent port 140 and tapers inward toward the front end and/or back end. In the embodiment illustrated, the taper begins immediately at filter inlet port 130. Thus, the hydraulic diameter of the filter cavity can decreases away from filter inlet port 130, helping reduce or eliminate dead space. Furthermore, filter vent port 140, in the embodiment shown, filter vent port 140 is open to the highest point in the filter cavity. Other embodiments may include un-tapered portions and tapered portions.

Figure 5A:
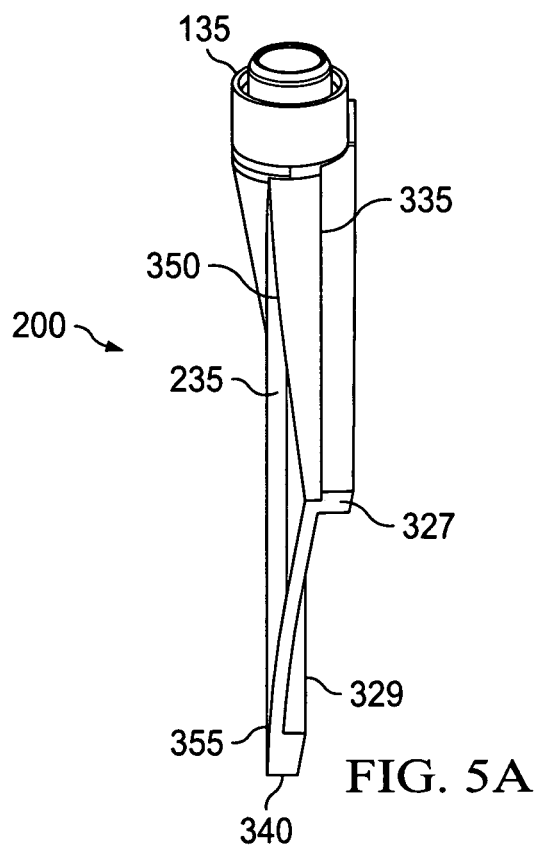
FIG. 5A-B are diagrammatic representations of one embodiment of a second housing portion.
Figure 5B:
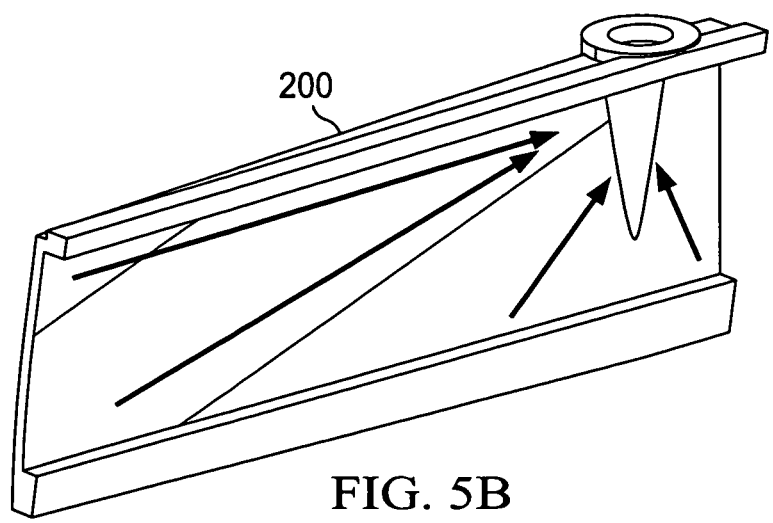

FIGS. 5A and 5B are diagrammatic representations of one embodiment of side cover 200. Side cover 200 may include joining edges 327 and 32a running the length of side cover 200 that may be joined to edges 277 and 279 of main shell 195 (see FIG. 4A) to create a seam parallel to the filter pleat folds. Side cover 200 may include a top wall portion 335, a bottom wall portion 340 and a sidewall 235. Side cover 200 may be shaped so that the widest portion of the cassette, or at least the widest portion of the downstream portion of the interior cavity, is coincident with the centerline of filter outlet port 135. Furthermore, side cover 200 may be shaped so that the area of the front section of the downstream portion of the interior cavity decreases from outlet port forward and/or the area of the back section of the downstream portion of the interior cavity decreases from filter outlet port 135 back. For example, top wall portion 335 may taper downward from filter outlet port 135 back. Top wall portion 336 may also taper downward from filter outlet port 135 forward. Similarly, bottom wall portion 340 may slope upward from filter outlet port 135 back and from filter outlet port 135 forward. Sidewall 235 may also taper inward from filter outlet port 135 back and filter outlet port 135 forward.

In the embodiment of FIG. 5A, side cover 200 is shaped so that top wall portion 335 slopes downward from filter outlet port 135 back and bottom wall portion 340 tapers upward from filter outlet port 135 back. Sidewall 235 is shaped so that the outer top edge 350 of sidewall 235 tapers inward along a curve from filter outlet port 135 back. The outer bottom edge 355 of sidewall 235, however, does not taper inwards, or tapers inward less than top edge 327, giving sidewall 235 a "twisted" profile. According to one embodiment, the twist can be selected to create a linear or other desired change in cross-sectional area or hydraulic diameter from filter outlet port 135 to the end of the filter cassette. The reduced or lack of taper at bottom edge 329 is provided to maintain material proximate to the joining seam between edge 329 and edge 279 (see FIG. 4A). The shape also provides a key to help ensure that the filter cassette can only be inserted into a filtration system in the proper orientation. In other embodiments, however, other sidewall shapes may be used.

FIG. 5B illustrates another view of one embodiment of side cover 200. The arrows of FIG. 5B illustrate that fluid generally flows to filter outlet port 135. According to one embodiment, side cover 200 is shaped to promote more uniform flow rate in the downstream portion of the filter cavity. Side cover 200 may include ribs or other features to help direct flow to the filter outlet port 135.

Figure 6:
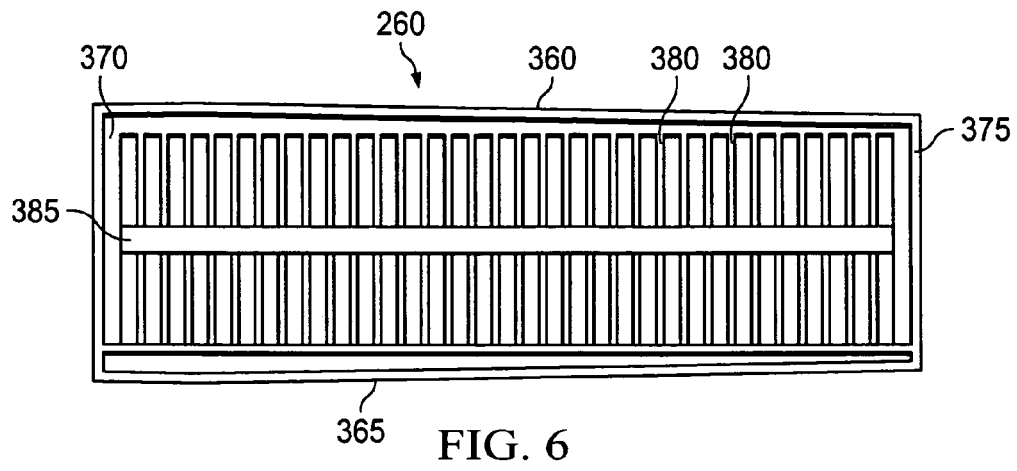
FIG. 6 is a diagrammatic representation of one embodiment of a filter cover.

FIG. 6 is a diagrammatic representation of one embodiment of filter cover 260. Filter cover 260 can be configured to maintain a filter element in place while allowing flow. According to one embodiment, filter cover 260 can comprise an outer frame having an upper member 360, a lower member 365, a front end member 370 and a back end member 375 spanning between upper member 360 and lower member 365. Upper member 360 and lower member 355 may include features to allow coupling of filter cover 260 to the remainder of the filter cassette. As discussed below, for example, filter cover 260 may include a tongue and groove feature for snap fit connection to the main shell. Filter cover 260 may be configured so that a first side of the upper member 360 contains a contact surface to contact the tips of top ribs 295 and lower member 365 includes a contact surface to contact the tips of bottom ribs 290.

Filter cover 260 may also include intermediate spaced members 380 spanning between upper member 360 and lower member 365. A support member 385 may provide additional support for spaced members 380. Preferably, the Intermediate members 380 or other retaining structure is sufficiently strong to hold the filter element against ribs of the main shell. The side cover may also include ribs to contact intermediate members 380 to provide additional support. Intermediate members 380 may be angled up and to the front, to allow such ribs on the side cover to act as flow directing devices to direct flow entering the downstream portion of the interior cavity to the filter outlet port. In other embodiments, fitter cover 260 may include mesh or other structural elements to maintain the filter element while allowing flow.

Figure 7:
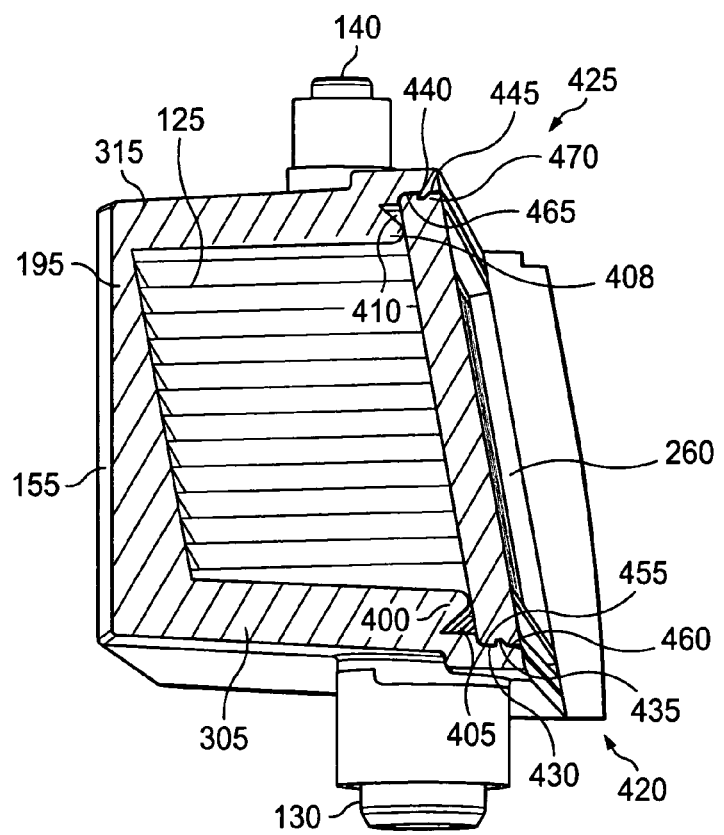
FIG. 7 is a diagrammatic representation of a cross section of one embodiment of a filter cassette.

FIG. 7 is a diagrammatic representation of one embodiment of a filter assembly with main shell 195, filter element 125 and filter cover 260. The bottom offsets, sidewall offsets and top offsets hold the filter element off of the bottom, upstream and top of the filter cavity respectively. Filter cover 260 runs from a first end of the filter cavity to a second end of the filter cavity and may be angled toward sidewall 155. Filter cover 260 holds filter element 125 in place when pressure is applied upstream of fitter element 125.

According to one embodiment, filter cover 260 and main shell 195 may cooperate to provide a shifted parallelogram filter element holding area. Filter cover 260 may be angled toward the upstream sidewall 155 from bottom to top and the sidewall offsets provided by the ribs projecting inward from the upstream sidewall 155 may be tapered toward the sidewall from bottom to top. The angle of filter cover 260 can match the taper angle of the ribs. Filter cover 260 can push filter element 125 against the ribs with the first (upstream) set of pleat tips abutting the ribs. On the upstream side, ribs allow filter element 125 to be held in without the need for an additional filter element holder/cage. In this configuration, a rectangular pleat pack will become a shifted rectangle with the pleat tips on the upstream side of filter element 125 generally arranged in a first plane defined by the ribs and the pleat tips on the downstream side of the filter element generally arranged in a second plane defined by filter cover 260. The shifted parallelogram (e.g., rhombus or rhomboid) filter element holding area provides several benefits. First, shifting the pleat pack allows room to place the filter outlet port without taking up too much horizontal room. Second, the pleat pack acts as part of the structure to reduce hydraulic diameter (linearly or otherwise).

According to one embodiment, the bottom offset portion 305 of the ribs may have a tapered tip portion 400 that is angled away from filter cover 260 from top to bottom to create a drain channel 405. Drain channel 405 can cross connect the flow channels between bottom ribs 290 (illustrated in FIG. 4B). When fluid is introduced to filter inlet port 130, it may flow from filter inlet port 130 to adjacent flow channels through the drain channel 405 in addition to along flow channel $325_2$ (FIG. 4B) as discussed above. Preferably, the hydraulic diameter of filter inlet port 130 is less than or equal to sum of the hydraulic diameters of channel $325_2$ at filter inlet port 130 and the drain channel 405 (in both directions).

According to one embodiment, the opening to filter inlet port 130 overlaps drain channel 405 (see FIG. 4A). When pressure is removed from filter inlet port 130, fluid remaining in in the cassette can flow to drain channel 405 because the bottom surface of the upstream portion of the interior cavity may be sloped downward toward drain channel 405 (e.g., from sidewall 155 to drain channel 405). Fluid in drain channel 405 may flow to filter inlet port 130 because the bottom surface of the interior cavity is sloped toward filter inlet port 130 (e.g., as discussed above in conjunction with FIGS. 4A and 4B).

Similarly, the top offset portions 315 may contain a tip portion 408 that is angled away from filter cover 260 from bottom to top to form a vent channel 410. Vent channel 410 can cross connect the flow channels between upper ribs 295 (illustrated in FIG. 4B). Preferably, the opening to filter vent port 140 overlaps vent channel 410. When the filter cassette is under pressure, gas can flow to vent channel 410 because the upper surface of the upstream portion of the interior cavity can be sloped upward toward vent channel 410. Gas can then flow up vent channel 410 to filter vent port 140 because vent channel 410 is sloped toward filter vent port 140 (e.g., as discussed above in conjunction with FIGS. 4A and 4B, the upper surface may be sloped upward toward filter vent port 140).

Filter cover 260 may be coupled to main shell 195 using a snap-fit, interference fit, sonic bonding or according to any suitable coupling mechanism. According to one embodiment, main shell 195 may include lower and upper coupling portions 420 and 425 to couple filter cover 260 to main shell 195. Coupling portion 420 defines a groove 430 and tongue 435 running the length of main shell 195. Coupling portion 425 includes a groove 440 and tongue 445 running the length of main shell 195. Filter cover 260 includes corresponding lower tongue 455 and groove 460 and upper tongue 465 and groove 470. Groove 430 captures tongue 455 and groove 460 captures tongue 435. Similarly, groove 440 captures tongue 465 and groove 470 captures tongue 445. In operation, filter cover 260 can be secured using a snap-fit, with upper and lower coupling portions spreading apart slightly to allow tongues 455 and 485 to pass tongues 435 and 445 respectively and seat in grooves 430 and 440. The resilience of the main shell 195 material can cause the coupling portions 420 and 425 to snap back to a position in which filter cover 250 is captured. According to one embodiment, the snap can be sufficient to provide haptic or auditory feedback that filter cover 260 is secure.

Figure 8:
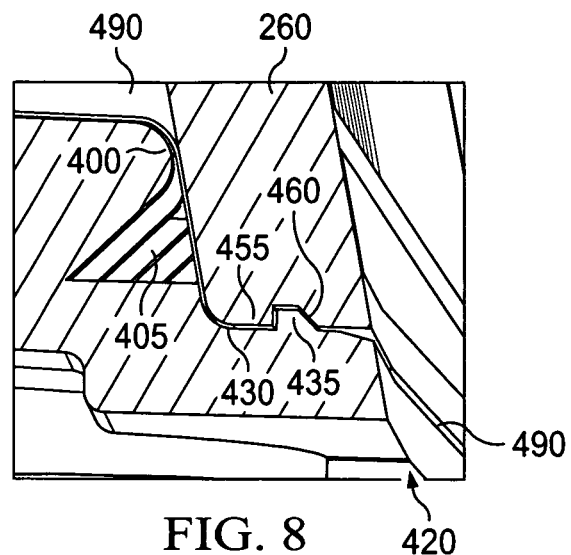
FIG. 8 is a diagrammatic representation of one embodiment of coupling a filter cover to a main shell.

As illustrated in FIG. 7, filter cover 260 can be installed so that the rib tips would otherwise contact or be very close to the contact surfaces so that a portion of the filter membrane may be captured between the rib tips and the contact surfaces of filter cover 260. According to one embodiment, the top and bottom membrane flaps of filter element 125 may extend a sufficient distance so that they pass between the tips 400/408 of the ribs and filter cover 260 to be captured between coupling portions 420 and 425 and filter cover 260. FIG. 8, for example, is a diagrammatic representation of one embodiment of a portion of main shell 195 connected to filter cover 260 illustrating lower membrane flap 490 captured between coupling portion 420 and filter cover 260. Capturing a portion of filter element 125 helps retain fitter element 125 for later assembly steps. Along with potting, sonic bonding or other coupling operation can be performed to further bond filter cover 260 to main shell 195 and/or the membrane to main shell 195 and filter cover 260, sealing the upstream portion from the downstream portion other than through the membrane.

Figure 9:
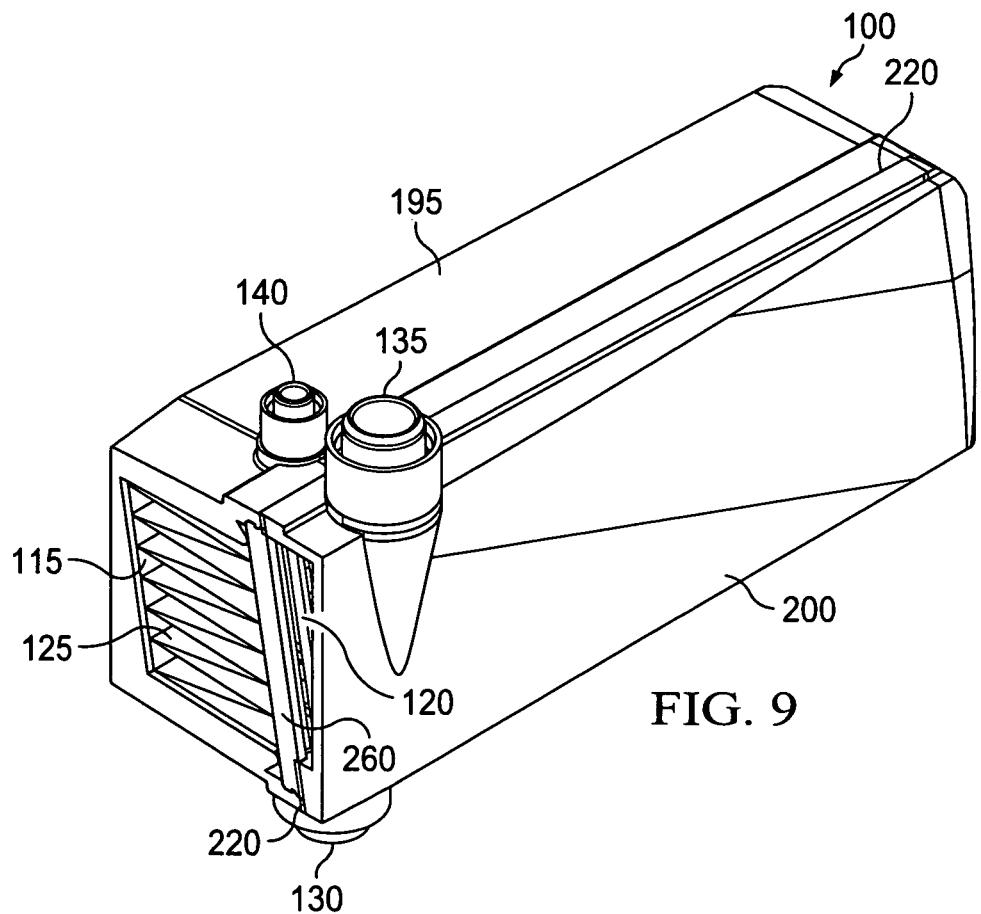
FIG. 9 is a diagrammatic representation of a view of one embodiment of a filter cassette.
Figure 10:
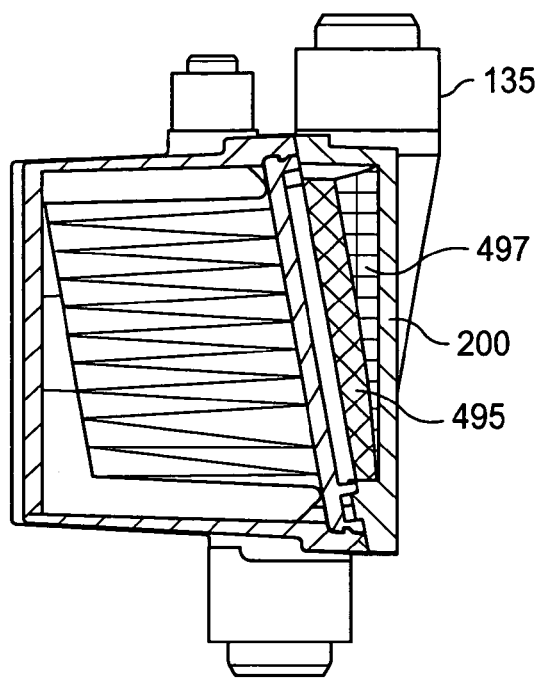
FIG. 10 is a diagrammatic representation of the hydraulic profiles of one embodiment of a filter cassette.

FIG. 9 is a diagrammatic representation of one embodiment of a filter assembly with main shell 195 coupled to side cover 200 at main bonding seams 220 running parallel to the long access of the filter cassette. Main shell 195 and side cover 200 form a cavity in which filter element 125 is disposed, separating the cavity into upstream portion 115 and downstream portion 120. FIG. 10 illustrates a cross-sectional view of the filter assembly of FIG. 9, further illustrating the hydraulic profile at the back of the downstream portion of the interior cavity (indicated at 496) and at filter outlet port 135 (Indicated as the combination of 495 and 497). It can also be noted that the hydraulic profile increases from bottom to top of the downstream portion of the interior cavity.

According to one embodiment, side cover 200 is shaped so that the hydraulic profile increases approximately linearly from the back of the downstream portion of the cavity to filter outlet port 135 and from bottom to top. Preferably, the hydraulic profile goes to zero at the back of the interior cavity. In other embodiments, however, the hydraulic profile may be greater than zero at the end of the operational filter membrane. According to one embodiment, the hydraulic diameter of filter outlet port 135 can be approximately equal to the hydraulic diameter of the downstream portion of the interior cavity proximate to filter outlet port 135. In other embodiments, the hydraulic diameter of filter outlet port 135 may be greater than or less than the hydraulic diameter of the downstream portion of the interior cavity proximate to the port.

Figure 11:
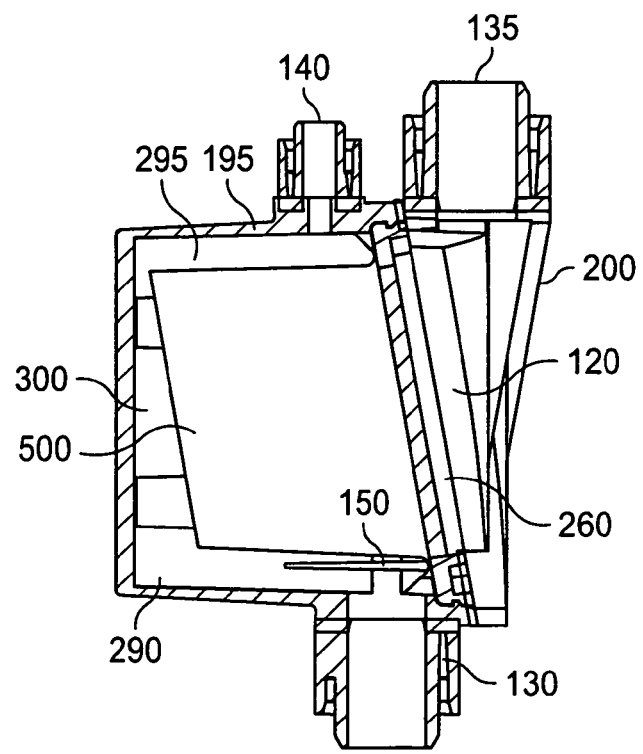
FIG. 11 is a diagrammatic representation of another embodiment of a filter cassette.

FIG. 11 is a diagrammatic representation of another embodiment of a filter assembly similar to that of FIG. 7. In the embodiment of FIG. 11, the filter element is not shown to better illustrate one embodiment of a shifted-parallelogram filter element holding area 500. Additionally, in FIG. 11, bottom rib 290, top rib 295 and intermediate rib 300 are illustrated, showing the sidewall offset portions of the ribs tapered to match the angle of filter cover 260. FIG. 11 further illustrates that embodiments of filter assemblies may include a flow guide 150 to prevent flow entering filter inlet port 130 from directly impacting the filter membrane.

With reference to FIGS. 1-11, ail materials that come in contact with the process fluid can be selected to be non-reactive with the process fluid and to minimize contamination.

Embodiments of the housing can be made from a variety of materials including but not limited to oleophilic resins, perfluorinated resin, (such as, but not limited to, polytetrafluoroethylene (PTFE), fluorinated ethylene propylene (FEP), perfluoroalkoxy polymer (PFA), polyvinylidene fluoride (PVDF), polyimide, polyetherimide, polycarbonate, polyether ether ketone (PEEK), polyethylene (PE), polypropylene (PP), metals or other materials. In one embodiment, the components of the filter assembly can be formed of multiple layers. The outer portion of the main shell and side cover can comprise a relatively inexpensive polymer while the inner layer can comprise a more expensive polymer that is less likely to react with or contaminate the process fluid. In one example, the main shell 195 and side cover 200 may comprise an outer shell formed of polypropylene or other material that can withstand the temperature and pressure requirement. Inside, an inner layer of typically more expensive, more chemically resistant, higher purity material can be thermoformed and attached to the edges of main shell 195 and side cover 200. Examples of such materials include but are not limited to PFA, FEP or other polymer. The entire wetted surface of the filter can be the more chemically resistant, higher purity polymer. In another embodiment, an inner layer of desired material can be over molded over the inside of the outer shell. Filter cover 260, on the other hand, can have a core of relatively inexpensive material and an outer coating or layer of more expensive, but less reactive materiel.

A filter cassette using a pleat pack fitter element 126 can be assembled according to the following steps. A filter membrane can be inserted into main shell 195 with the ends of the last flaps of the pleat sitting along the coupling portions 420 and 425. Filter cover 260 can be snap fit into place. This step locks the membrane in position with the tongue-and-groove fit between, the outlet cover and the shell. Unlike a typical cylindrical style cartridge device, there is no need to wrap a pleat pack to seal the two long membrane edges together before assembling into a device. Side cover 200 can then be bonded to main shell 196 using any suitable bonding scheme including, but not limited to, sonic bonding, welding, adhesives, thermal contact or non-contact bonding operations. According to one embodiment, bonding the housing and sealing the membrane edges can happen in a single bonding operation. Side cover 200 may also be coupled to main shell 195 using mechanical fasteners. If required, a gasket can be disposed between side cover 200 and main shell 195.

Figure 12:
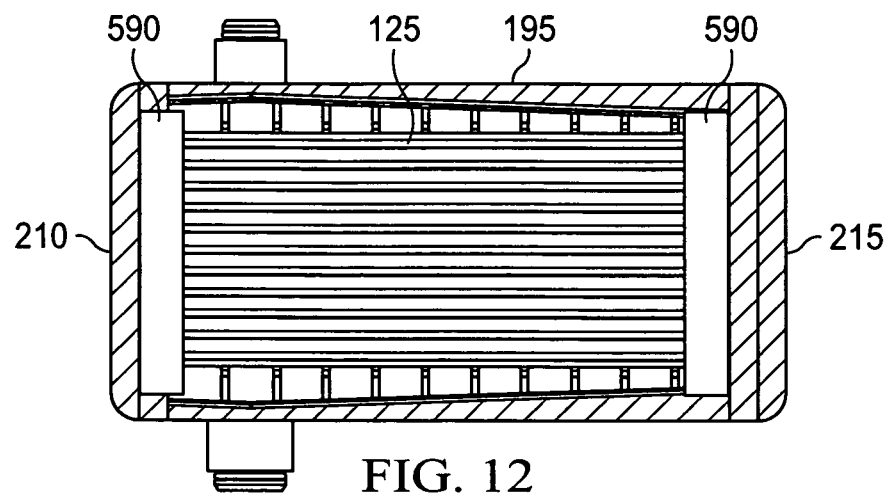
FIG. 12 is a diagrammatic representation of one embodiment of a filter cassette with potting.

The ends of the pleat pack can be potted in a polymer or resin. According to one embodiment, a desired length of each end of the assembly can be dipped in the desired potting material, such as a laminate, polymer, resin, adhesive or other potting material to seal the ends of the interior chamber and pleat pack. Preferably the potting material is a thermoplastic. By way of example, but not limitation, the front and back 0.125 inches to 0.5 inches of the pleat pack can be sealed with potting material. The potting material can seal the ends of the pleat pack and interior cavity, separating upstream portion 115 and downstream portion 120 of the filter assembly, and prevent hold up volume. In other embodiments, the ends of the pleat pack can be sealed with a potting material prior to insertion in main shell 195, however doing so may result in some dead space between the potting and the ends of the filter cassette. The front and back end covers 210/215 can be coupled to the main body of the filter cassette using the potting material, sonic bonding, welding, adhesives, contact or non-contact bonding operations, mechanical fasteners or otherwise. FIG. 12, for example, is a diagrammatic representation of one embodiment of a filter assembly showing a pleat pack in place and sealed with potting material 590.

Figure 13:
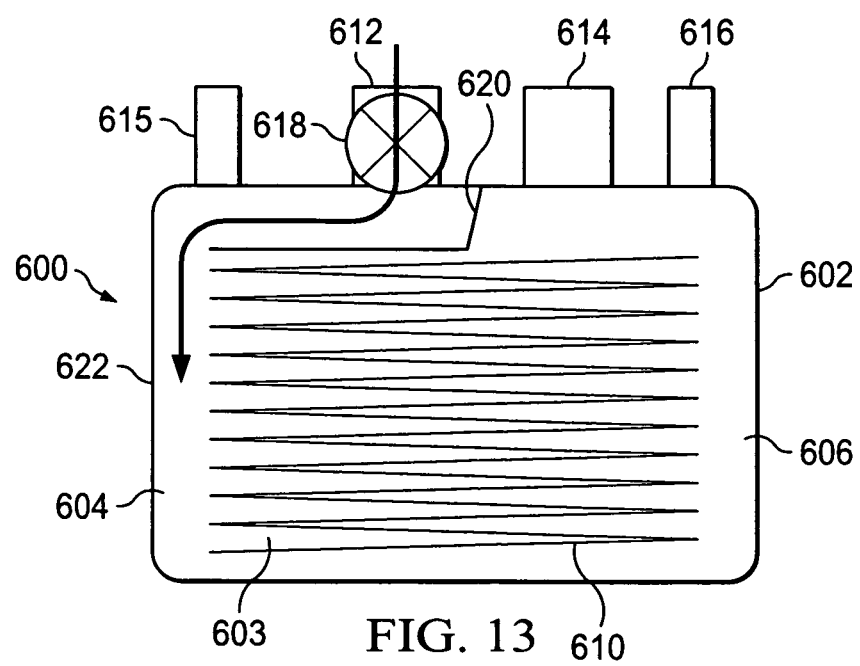
FIG. 13 is a diagrammatic representation of another embodiment of a filter assembly.

FIG. 13 is a diagrammatic representation of another embodiment of a filter assembly 600 having a filter housing 602 defining a filter cavity 603 divided into an upstream portion 604 and downstream portion 606 by a filter element 610 disposed in the filter cavity 603. Filter element 610 can be any suitable filter media including, but not limited to pleated filters, depth filters, hollow fiber membranes, or other filters. In yet another embodiment, filter element 610 can include a polymer filtration material sandwiched between multiple membranes. In one embodiment, filter element 610 comprises a rectangular pleat pack. A filter inlet port 612 is located upstream of filter element 610 and a filter outlet port 614 is located downstream of filter element 610 (from a fluid flow perspective running through the filter). Filter vent ports (e.g., filter vent ports 615 and 616) can be located upstream and/or downstream of filter element 610. Vent ports 615 and 616 may also optionally be connected to valves.

According to one embodiment, filter inlet port 612 is located at the top of filter assembly 600 and defines an downward vertical inlet flow path, filter outlet port 614 is located on top of filter assembly 600 and defines an upwardly vertical outlet flow path and filter vent port 616 defines an upwardly vertical vent flow path. Preferably, filter vent port 615 is open to the upstream portion 604 of the filter cavity at the highest point possible so that any gas in upstream portion 604 naturally rises to filter vent port 615. Similarly, an outlet vent port 616 can be provided that preferably is open to the downstream portion 606 of the filter cavity at the highest point possible so that any gas in downstream portion 606 naturally rises to vent port. Filter inlet port 612 may include an inlet valve 618 to seal filter inlet port 612.

To efficiently place ports in a footprint, filter element 610 may overlap filter inlet port 612, filter outlet port 614 and/or filter vent port(s) 615/616. If the flow of fluid entering filter assembly 600 is sufficient, fluid flow directly impacting filter element 610 may damage it. Accordingly, a flow guide 620 (e.g., a baffle, tubing or other flow directing structure) disposed between filter element 610 and the inlet can obstruct flow along the axis of the inlet and redirect flow toward upstream sidewall 622. As discussed above, the walls can be selected to be more philic to gas than filter element 610 to promote affinity of gas to wall 622. While flow guide 620 is illustrated as extending generally perpendicular to the axis of filter inlet port 612, flow guide 620 may be arranged at other angles. In other embodiments, filter element 610 may provide sufficient resistance to direct flow to upstream sidewall 622.

Figure 14:
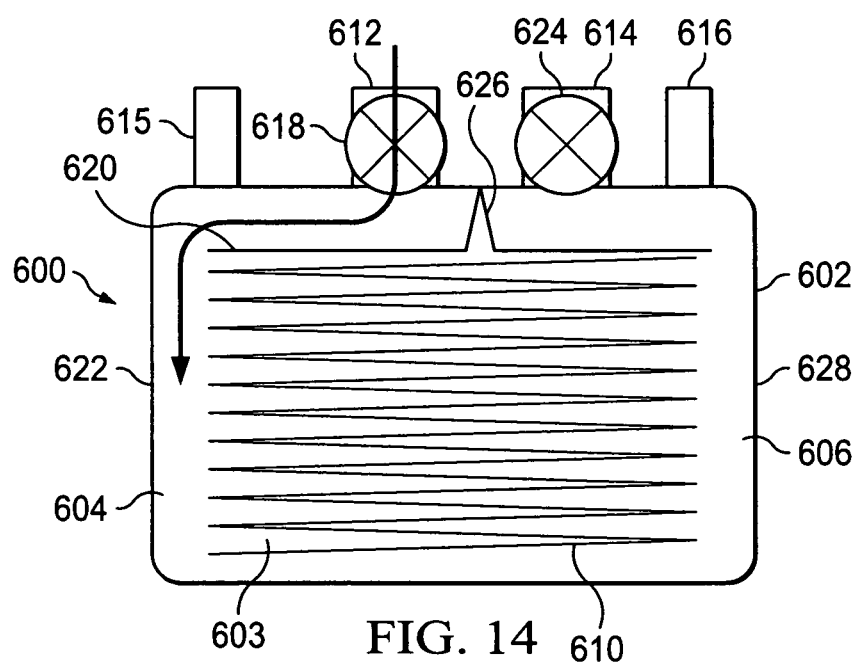
FIG. 14 is a diagrammatic representation of yet another embodiment of a filter assembly.

FIG. 14 is a diagrammatic representation of another embodiment of a filter assembly 600 similar to that of FIG. 16, but illustrating an outlet valve 624 to seal filter outlet port 614 and a second flow guide 626 that ensures fluid flows along sidewall 628 before exiting downstream portion 606. According to one embodiment, inlet valve 618 and outlet valve 624 can seal when filter assembly 600 is removed from a manifold, when fluid pressure of fluid flowing into filter assembly 600 drops below a threshold amount or some other condition is met. In one embodiment, inlet valve 618 and outlet valve 624 can be poppet valves. The vent ports (or corresponding ports in the manifold) may be pressure actuated with an actuation pressure that is greater than the driving pressure of the fluid. For example, the filter or manifold can include valves, such as poppet valves or other valves so that gas is only vented when it exceeds a particular pressure (e.g., 5 psi above the expected operating pressure of filter assembly 600). The ports can comprise Connectology® connections from Entegris, Inc. of Billerica, Mass., Swagelok fittings or other connection capable of fluidic sealing. While FIG. 14 illustrates the Inlet and outlet valves integrated as part of the filter assembly, in other embodiments, the valves may be part of the manifold to which the filter connects or may be placed elsewhere, if present et all.

Figure 15:
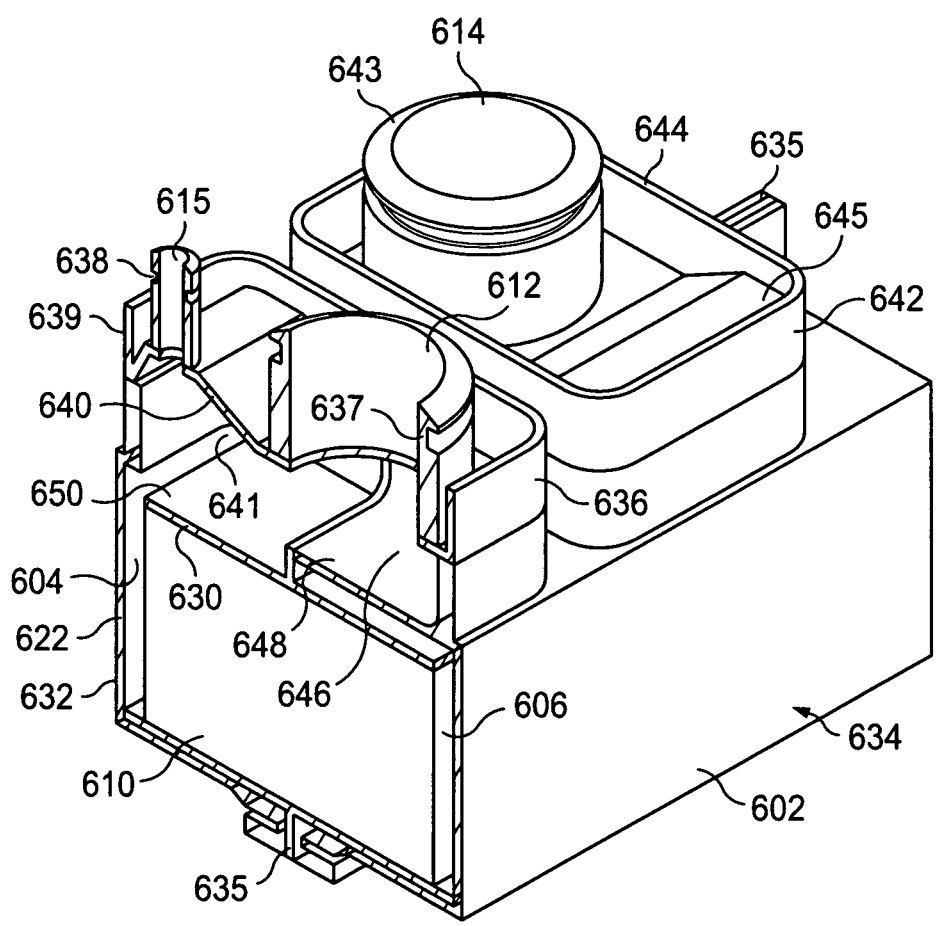
FIG. 15 is a diagrammatic representation of one embodiment of a filter cassette.

According to one embodiment, filter assembly 600 can be arranged as a filter cassette. FIG. 15 is a diagrammatic representation one embodiment of a cross section of a filter cassette that includes a filter element 610 arranged in a filter holder 630 disposed in filter housing 602. Filter housing 602 comprises a main body having symmetrical portions 632 and 634 that couple together at joining seams 635 to partially define the filter cavity. Filter element 610 divides the filter cavity into upstream portion 604 and downstream portion 606.

Filter inlet and outlet port members 636 and 642 are coupled to the housing 602 and provide ports open to the filter cavity. The filter port members 636 and 642 can accommodate valves, such as poppet valves or other valves. According to one embodiment, inlet port member 636 comprises a male fitting 637 for inlet port 612, a male fitting 638 for inlet vent port 615 and a fluid retaining wall 639 extending from a base 640, the fluid retaining wall 639 encircling fittings 637 and 638. Fittings 637 and 638 are received by complementary female ports on a manifold to create a sealed connection. Retaining wall 639 surrounds the fittings to create, in cooperation with base 640, a drip cup which can catch drips when the filter cassette is removed from the manifold. The base 640 of port member 636 slopes upward from fitting 637 to fitting 638 to create a gas accumulation region 641 open to the highest point of upstream portion 604. Intel vent port 615 is open to the gas accumulation region.

In the embodiment of FIG. 15, filter outlet port member 642 similarly includes a male fitting 643 for outlet port 614 and a wall 644 extending from a base 645 to form a drip cup about port 614. In this example, there is no vent port on filter outlet port member 642, though in other embodiments there can be. In some embodiments, a single port may act as the filter outlet port and outlet side filter vent port. In such a case, it may be preferable that the outlet port 614 be open to the highest area in fluid communication with downstream portion 606 so that gas rises to the filter outlet port 614.

Inlet port member 636 in cooperation with the main body of the cassette forms an inlet region 646 of upstream portion 604 open to inlet port 612, but separated by filtration or purification media from downstream portion 606. According to one embodiment, inlet region 646 is at least partially defined by a surface 648 extending perpendicular to the primary axis of inlet port 612 (e.g., across the flow path of fluid entering through inlet port 612) to redirect flow horizontally. An upper surface 650 of filter holder 630 acts in cooperation with surface 648 to form a flow guide (e.g., a bathe) that directs flow to wall 622.

In operation, fluid enters the filter cassette through inlet port 612 in a first direction (e.g., vertically) and is redirected in a second direction to wall 622 by surfaces 648 and 650. Fluid can flow into the space between filter element 610 and wall 622 through a gap between filter holder 630 and wall 622. The fluid will pass through filter element 610 and leave the filter cassette via outlet port 614. Thus, the filter cassette provides NFF. Gas attracted to wall 622 rises to gas accumulation region 641 from upstream portion 604 and leaves through inlet side vent port 615.

Figure 16A:
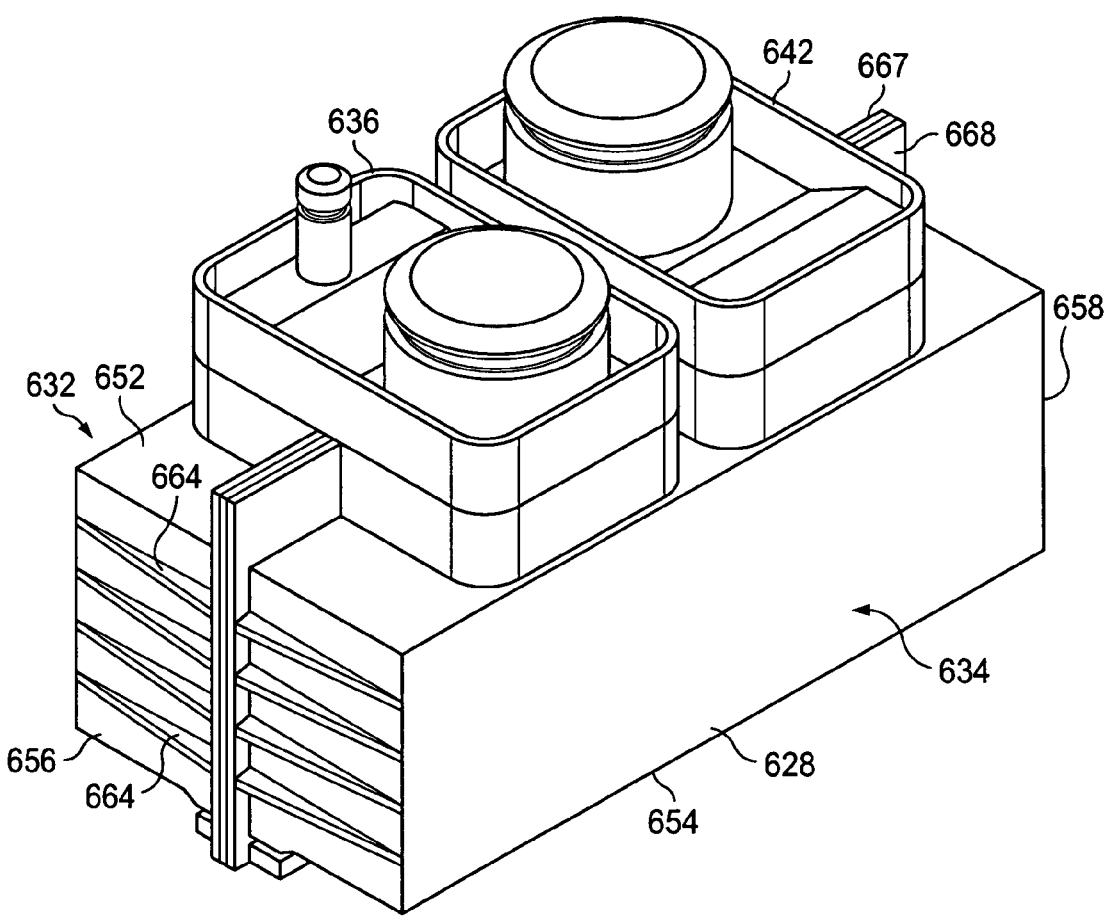
FIGS. 16A-16C are a diagrammatic representations of additional views of one embodiment of a filter cassette.
Figure 16B:
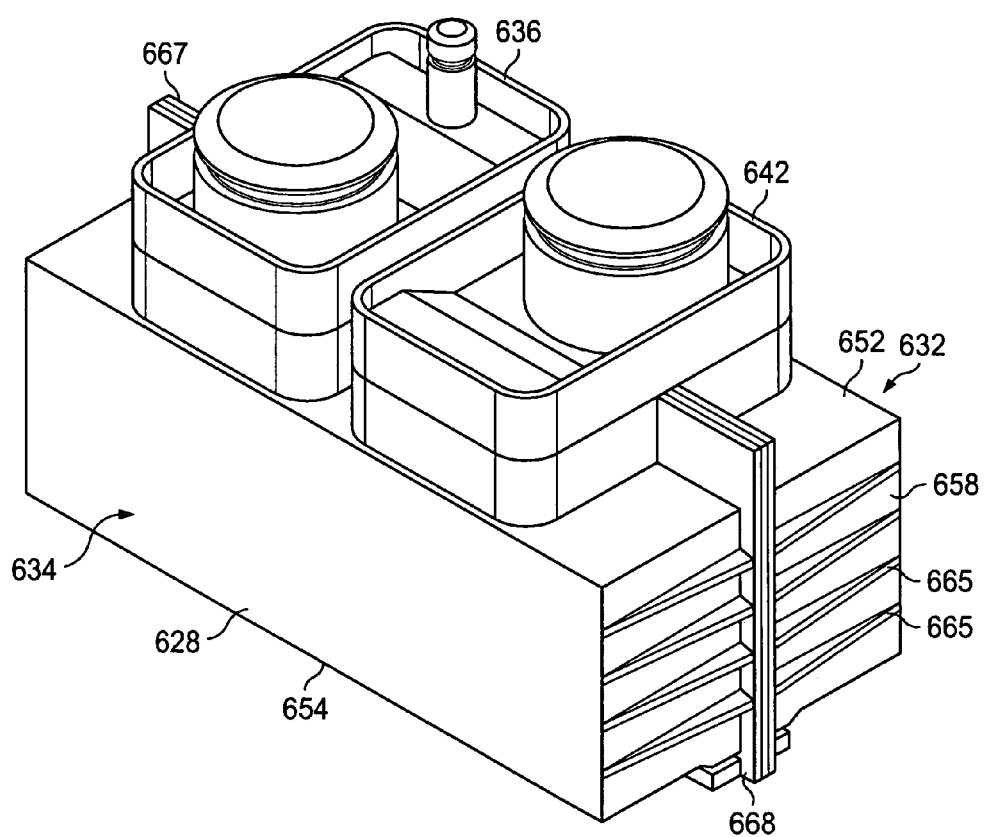
Figure 16C:
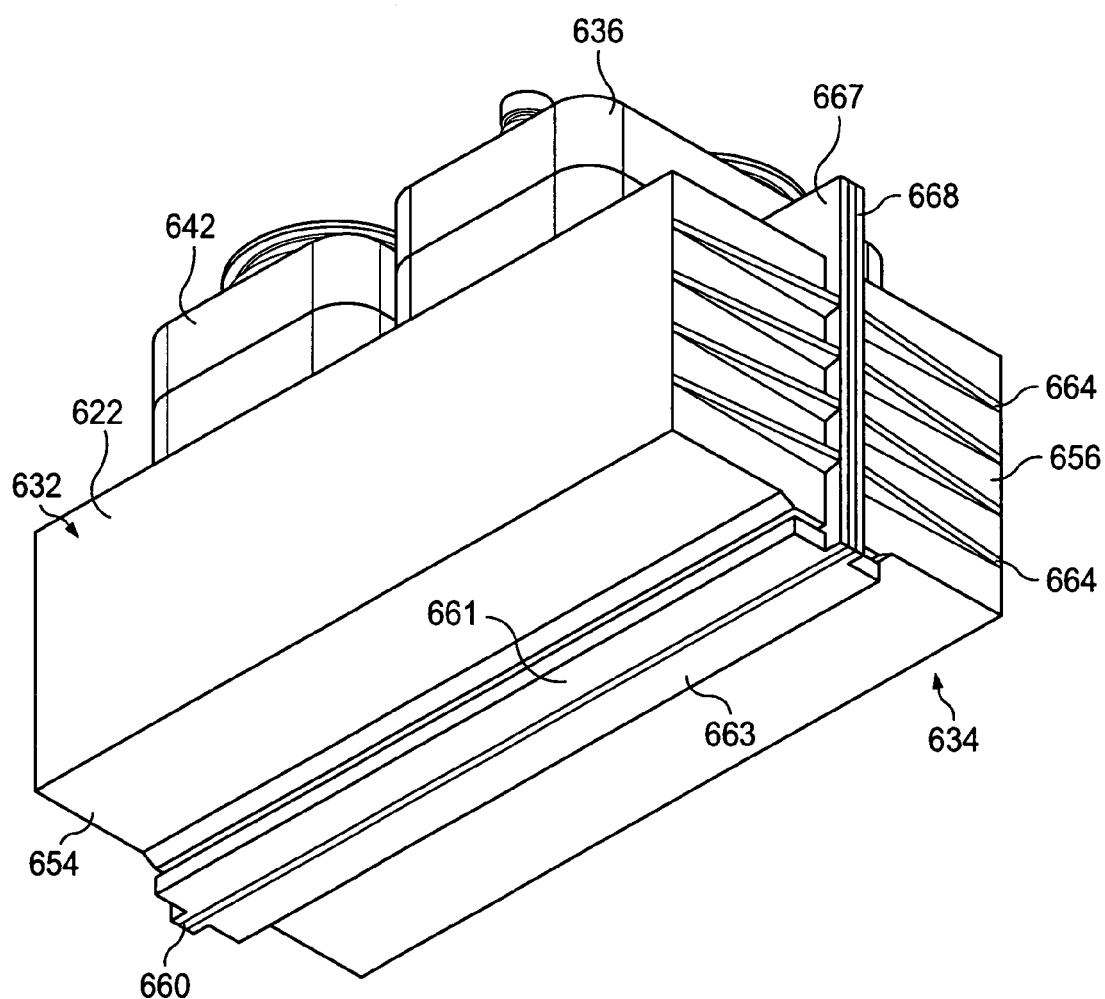

FIGS. 16A-16C are diagrammatic representations of exterior views of one embodiment of a filter cassette showing various features discussed above. According to one embodiment, the filter cassette can be generally rectangular with a top wall 652, bottom wall 654, end walls 656 and 658, sidewall 622 and sidewall 628 formed from main body portions 632 an 634. Embodiments of the main body can be made from a variety of materials including but not limited to oleophilic resins, perfluorinated resin, (such as, but not limited to, polytetrafluoroethylene (PTFE), fluorinated ethylene propylene (FEP), perfluoroalkoxy polymer (PEA)), polyvinylidene fluoride (PVDF), polyimide, polyetherimide, polycarbonate, polyproproplyn (PE), polyethylene (PE), polyether ether ketone (PEEK), metals or other materials. In one embodiment, the main body can be formed of multiple layers. The outer shell can comprise a relatively inexpensive polymer while the inner layer can comprise a more expensive polymer that is less likely to react with or contaminate the process fluid. According to one embodiment, the main body may comprise an outer shell can be formed of polypropylene or other material that can withstand the temperature and pressure requirement. Inside the outer shell, an inner layer of typically more expensive, more chemically resistant, higher purity material can be thermoformed and attached to the edges of the outer shell. Examples of such materials include but are not limited to PFA, FEP or other polymer. The entire wetted surface of the filter can be the more chemically resistant, higher purity polymer. In another embodiment, an inner layer of desired material can be over molded over the inside of the outer shell.

The thicknesses of the various walls can be selected with the understanding that the filter cassette may act as a pressure vessel. In typical prior art systems, a filter must have walls sufficient to withstand the expected operating pressures of the filter. That is, the filter must have sidewalls that are sufficiently thick to keep deflection within an acceptable range (e.g., generally less than 10%, less than 5%, less than 1% at 100 psi). The filter cassette, on the other hand, can have relatively thin sidewalls. The sidewalls can have a thickness that would allow the sidewalls to deflect greater than an acceptable amount, say greater than 30%, during expected operating pressures. As discussed below, the fitter bay can provides additional support to keep deflection within the acceptable range. End walls 656 and 658 can be the same thickness as sidewalls 622 and 628 or a different thickness. According to one embodiment, end walls 656 and 658 can include ribs 664 and 665 to minimize deflection. Top wall 652 and bottom wall 654 may have a similar thickness to sidewalls 622 and 628, may be thicker to minimize deflection or may be thinner.

Each of main body portions 632 and 634 can each include a continuous rib of material (ribs 667 and 665, respectively) extending outwardly from the respective walls. According to one embodiment, the ribs 667 and 668 extend outwardly at the edge of the respective main body portion to create a larger usable bonding area for joining the main body portions.

The filter cassette can include a guide member 660 to help guide the filter cassette into a filter bay. In the example of FIGS. 16A-C, guide member 660 includes a set of laterally extending guide flanges 661 and 663 extending from ribs 667 and 668 respectively to form a rail that can be received in a corresponding track of a filter bay assembly. In other embodiments, a filter cassette can include multiple rails or other guide members all together.

FIGS. 16A-16C also illustrate that one embodiment of a filter cartridge can include symmetric ports. Having symmetric ports and symmetric methods of construction provides a greater degree of flexibility than traditional filters. By way of example, but not limitation, the cassettes can be back flushed, filtration processes can be run in reverse direction, vacuum can be applied to either side of the cartridge allowing for pervaporation sequences. Asymmetric cartridges, on the other hand, limit the ability to optimize flow in either direction.

Figure 17:
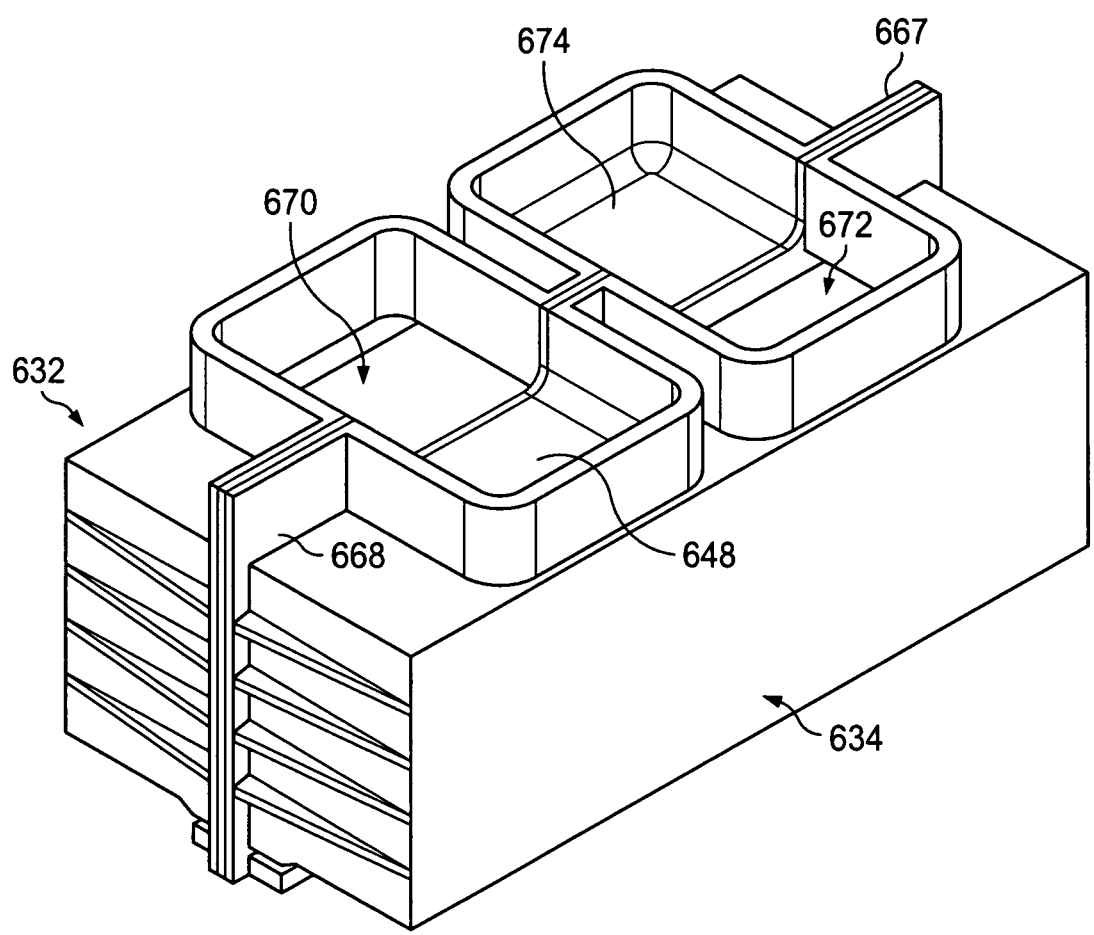
FIG. 17 is a diagrammatic representation of one embodiment of a housing of a filter cassette.

FIG. 17 is a diagrammatic representation of one embodiment of the main body of filter cassette showing various features discussed above. As illustrated, in FIG. 17, ribs 667 and 668 turn inward from edges of main body portions 632 and 634 for a first portion of the length of the main body and a second portion of the length of the main body to form the sidewalls of an inlet bowl 670 and outlet bowl 672. According to one embodiment, main body portion 634 includes surface 648, which may be a portion of top wall 652, extending across the portion of the bottom of inlet bowl 670 formed by main body portion 634. The other side of inlet bowl 670 may be open to the filter cavity. That is, main body portion 632 may be open within the portion of the inlet bowl formed by main body portion 632. Thus, inlet bowl 670 may be open to the upstream portion of the filter cavity but not the downstream portion. Similarly, main body portion 632 includes surface 674, which may be a portion of top wall 652, extending across the bottom of the portion of outlet bowl 672 formed by main body portion 632. Outlet bowl 672 may be open to the downstream portion of the filter cavity but not the upstream portion of the filter cavity. That is, main body portion 634 may be open within the portion of the outlet bowl formed by main body portion 634. According to one embodiment, the port members 636, 642 (see FIG. 16B) may be bonded to the top edges of the inlet bowl and outlet bowl sidewalls using ultrasonic bonding, adhesives or other type of bonding with the filter inlet port aligned with surface 648 and the filter outlet port may be aligned with surface 674.

In many previous filters, the port connections are manufactured as part of the main housing. Consequently, different tooling is needed to manufacture the filter housing for each connection type and size. The embodiment of FIG. 17 provides the advantage that the symmetric main body of the filter cassette, with the filter element installed, can be assembled without the inlet and outlet ports attached. Appropriate sized ports can then be added as needed. In such a system, a single tool can be used to manufacture the main body of the filter housing for a variety of port types. A specific tool is only required for the specific types of port members, not the filter housing with ports as a whole.

Figure 18:
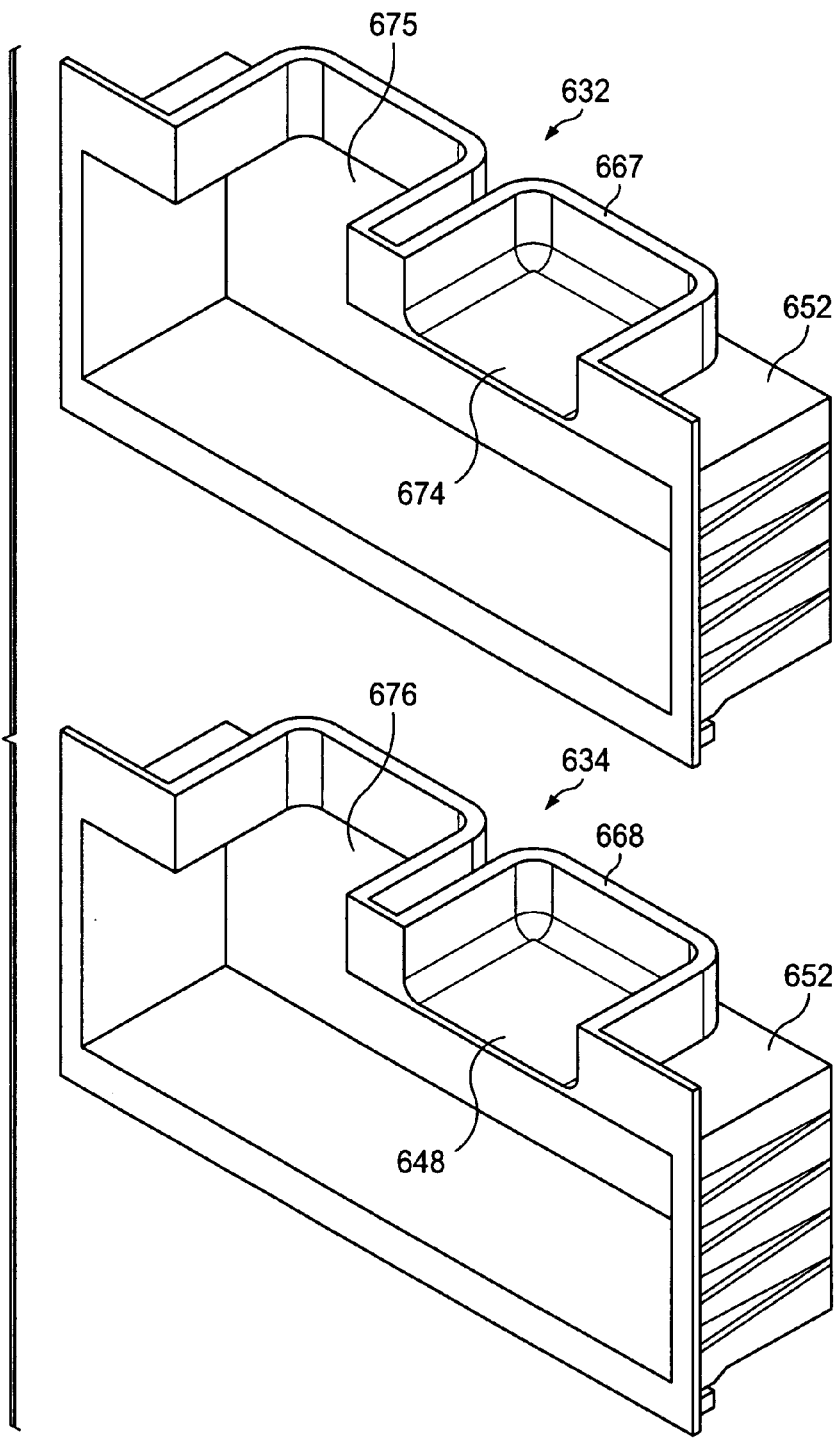
FIG. 18 is a diagrammatic representation of portions of a filter housing.

FIG. 18 illustrates one embodiment of symmetric main body portions 632 and 634 of the main body of the cassette. As can be seen in FIG. 18, portion 632 can be identical to portion 634 such that the two halves of a filter cassette main body can be manufactured using a single tool. In this embodiment, the portion of top wall 652 defined by main body portion 632 is continuous in the perimeter of the outlet bowl 672 (illustrated by surface 674), but is open within the perimeter of inlet bowl 670 (illustrated at 676). Similarly, in this embodiment, the portion of top wall 652 defined by main body portion 634 is continuous in the perimeter of the inlet bowl 670 sidewalks (illustrated by surface 648) and open within the perimeter of outlet bowl 672 sidewalls (illustrated at 676).

Figure 19:
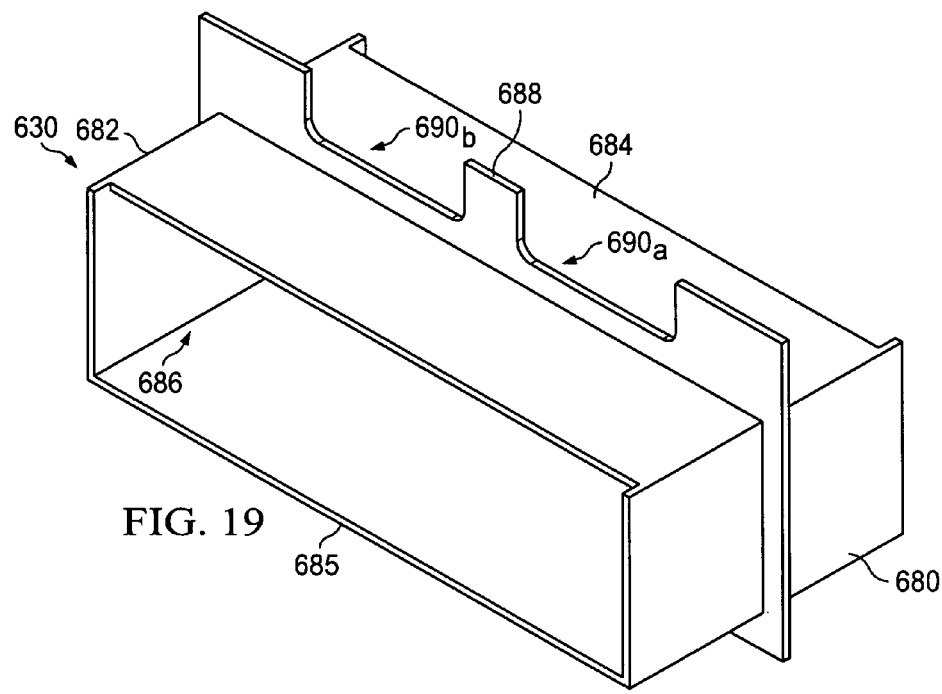
FIG. 19 is a diagrammatic representation of one embodiment of a filter element holder.

FIG. 19 is a diagrammatic representation of one embodiment of a filter holder 630. Filter holder 630 can include end walls 680 and 682 with a top wall 684 and bottom wall 685 extending between the end portions in a spaced relationship to define a filter element holding area 686 open on both sides. In the embodiment of FIG. 19, the end walls 680 and 662 can be the same width as the filter cavity and the length of filter holder 630 can be the same as the length of the filter cavity so that filter holder 630 fits snuggly in the filter cavity. Top portion 684 can be slightly narrower than end portions 680 and 682 so that when filter holder 630 is arranged in the filter cavity, there is a slight gap between the edges of top portion 684 and the sidewalks of the filter cavities to allow fluid to flow into/out of the spaces between the filter element and the sidewalks. In some embodiments, the filter holder is symmetric. This is advantageous to reduce manufacturing costs and the number of parts.

Filter holder 630 can also include a thin continuous piece of material (referred to herein as flashing 688) extending outward from the outer surfaces of filter holder 630. Flashing 688 extends a sufficient distance so that flashing 688 will be positioned between ribs 667 and 668 when the filter cassette is assembled. Flashing 688 can include cutouts 690 that align with inlet bowl 670 and outlet bowl 672. This provides an opening between, for example, the inlet region 646 and the remainder of the upstream portion 604 of the filter cavity (see FIG. 15). Thus, for example, opening $690_a$ can allow flow of fluid entering opening the filter inlet port and being redirected by surface 648 to flow into opening 675 (see FIG. 18). Similarly, opening $690_b$ can allow fluid exiting through opening 676 to flow over surface 674 and out the filter outlet port (see FIGS. 15 and 18). According to one embodiment, sonic welding can be used to bond ribs 667, 668 and flashing 688 and seal portions 632, 634 and filter holder 630. Therefore, it may be preferable that flashing 688 is formed of a material fusible to the material of the main body.

Filter element holding area 686 can be packed with a filter element. The filter element can be bonded to the inner surfaces of filter element holding area 666. In one embodiment, the filter element may comprise a rectangular pleat pack. A first set of pleat tips may face the upstream portion of the chamber and a second set of pleat tips may face a downstream portion of the filter chamber. In general, the filter element can be packed so that the upstream surface of the filter element is generally flat rather than curved around a central core, though there may be some bending at the edges if the filter element is doubled back on itself and the filter may include pleats. Using a flat rather than a curved filter provides the advantages that more membrane material can be packed in a given volume and filtration mediums having less compliant bending moments can be used. Furthermore, because a pleated filter can be arranged with a generally flat profile (e.g., with the pleats compressed), the upstream and downstream dimensions of the pleats can be identical (unlike a circular filter design in which the pleats will be more spread out on the upstream side than the downstream pleats). In other embodiments, the pleats of the rectangular pleat pack may be separated.

Embodiments of filter holder 630 can be made from a variety of materials including but not limited to oleophilic resins, perfluorinated resin, (such as, but not limited to, polytetrafluoroethylene (PTFE), fluorinated ethylene propylene (FEP), perfluoroalkoxy polymer (PFA)), polyvinylidene fluoride (PVDF), polyimide, polyetherimide, polycarbonate, polypropylene (PP), polyethylene (PE), polyether ether ketone (PEEK), metals or other materials. In one embodiment, the filter holder 630 can be formed of multiple layers. The core can comprise a relatively inexpensive first polymer (e.g., polypropylene) while any layers that contact fluid can comprise a more chemically resistant, higher purity second polymer that is less likely to react with or contaminate the process fluid. According to one embodiment, the second polymer can be over molded on the first polymer.

Figure 20:
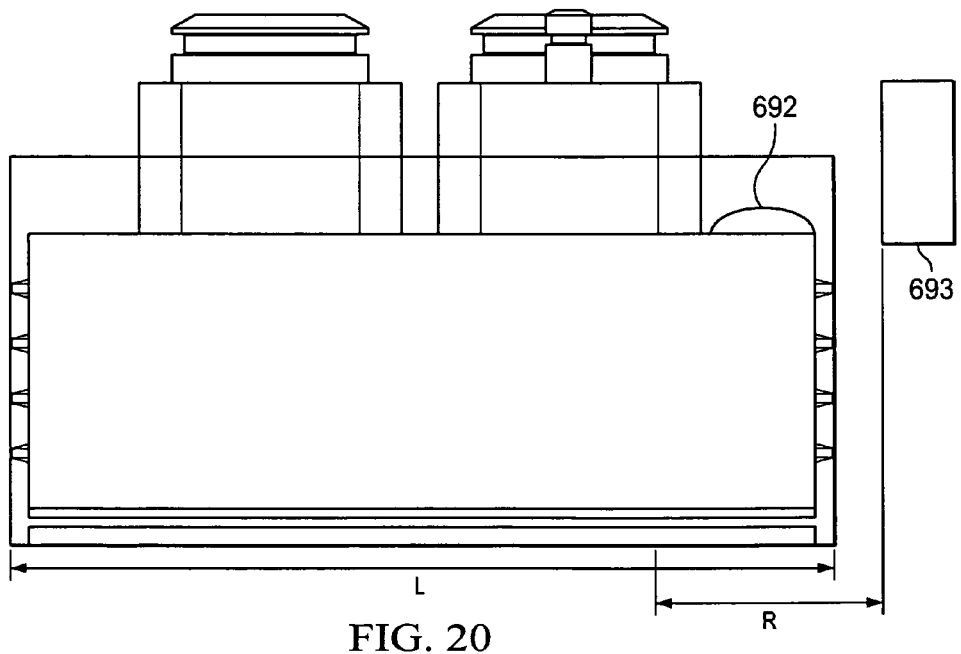
FIG. 20 is a diagrammatic representation of another embodiment of a filter cassette.

FIG. 20 illustrates one embodiment of a filter cassette having an RFID tag 692 attached thereto and an RFID readers 693. RFID reader 693 may have a limited range "R", say 4 inches. If the length "L" of the cassette is greater than R, the RFID tag 692 can be placed on the cassette so that RFID reader 693 cannot read the RFID tag 692 when the cassette is placed in a filter bay backwards. Control schemes can be implemented so that upstream components will not provide fluid to the filtration system if a cassette is installed improperly, or not installed at all. Embodiments may also include sensors located throughout the first and second manifold to read various fluid properties such as pressure or temperature.

Figure 21:
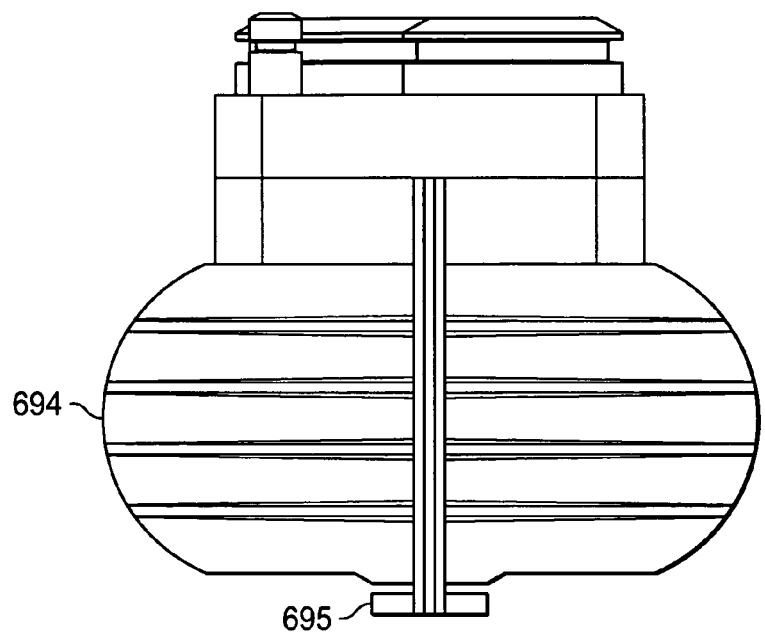
FIG. 21 is a diagrammatic representation of another embodiment of a filter cassette.
Figure 22:
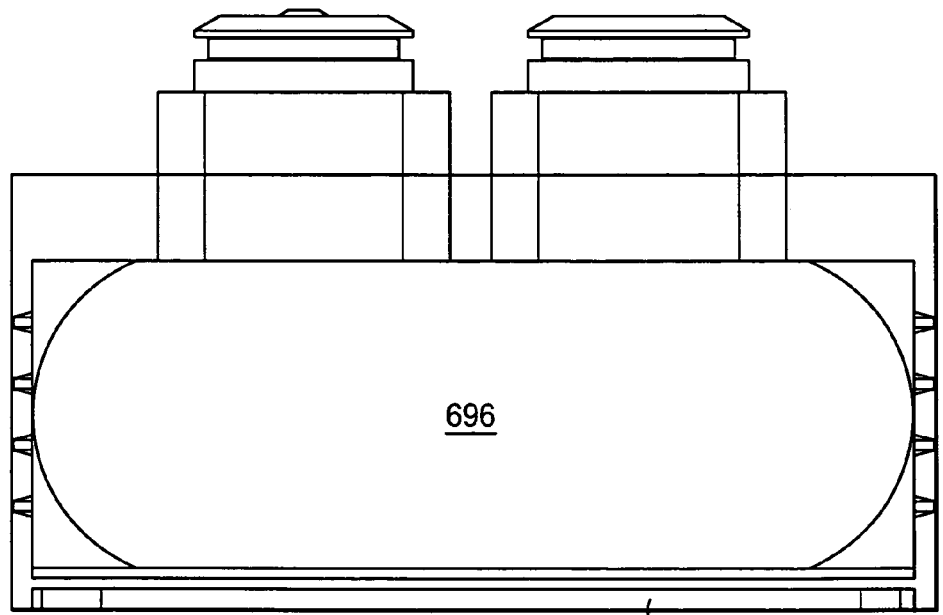
FIG. 22 is a diagrammatic representation of another embodiment of a filter cassette.
Figure 23:
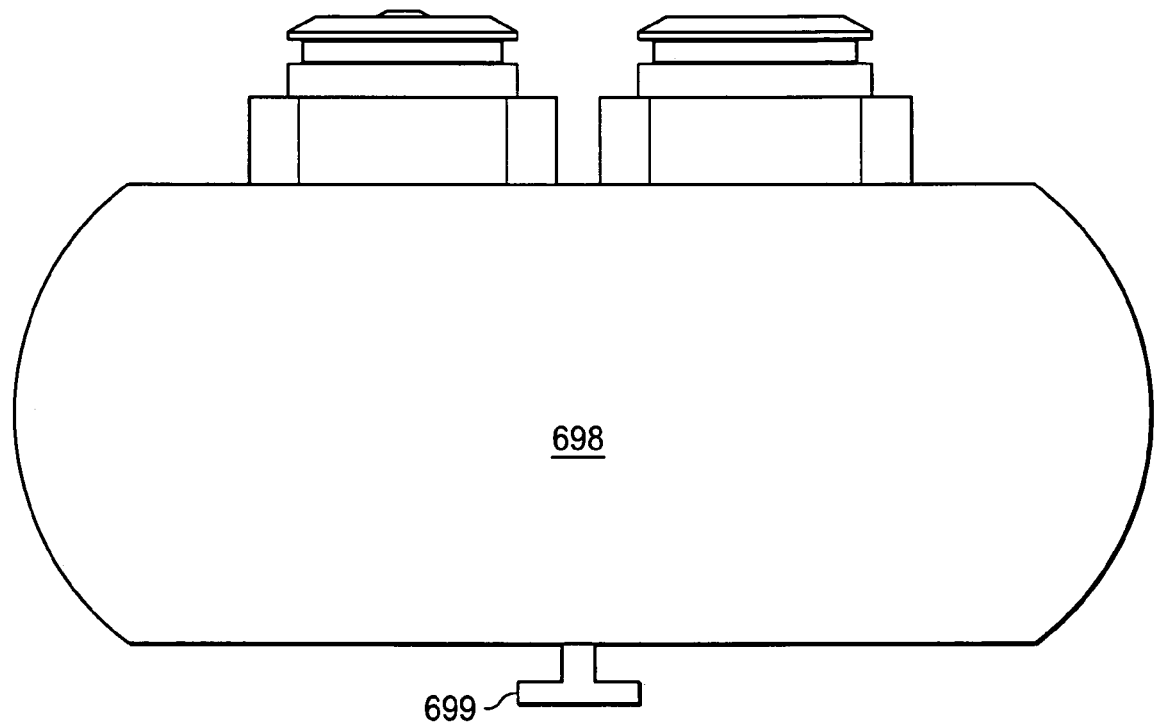
FIG. 23 is a diagrammatic representation of another embodiment of a filter cassette.

In several of the above examples, the filter cassette had a generally rectangular profile. FIG. 21 is a diagrammatic representation of one embodiment of a filter cassette having a main body 694 with a rounded rear and front walls, such that the sidewalls of the cassette are curved. The cassette can include a guide mechanism 695 that can fit in slotted track of a filter bay assembly. FIG. 22 is a diagrammatic representation of another embodiment of a cassette having an elliptical main body 696 from the side. The cassette can include a guide mechanism 697 that can fit in slotted track of a filter bay assembly. FIG. 23 is another embodiment of a cassette, with a cylindrical main body 698 and guide mechanism 699. The various examples of cassette shapes are provided by way of example and other cassette profiles, in some embodiments comprised from symmetrical main body portions, can be used. Furthermore, the filter element within the cassette may have any desired shape, including a tubular shape curved about a central core.

Although specific embodiments have been described, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the Invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention. For example, the membrane can be surface modified by chemical coating, plasma treatment, laser or lamp treatment and the like to include ion exchange groups, hydrophilic groups, hydrophobic groups and other functional moieties.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and Illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A filter assembly for filtering liquids, the filter assembly comprising: a filter housing having a filter inlet defining an inlet flow path and a filter outlet spaced from the filter inlet defining an outlet flow path, the filter housing defining a filter cavity comprising an upstream portion of the filter cavity in fluid communication with the inlet and a downstream portion of the filter cavity in fluid communication with the outlet;
said filter housing comprising a main shell, a side cover, a front end cover, and rear end cover that form the filter housing and the filter cavity in which a filter element is disposed;
a filter cover coupled to the filter housing to retain the filter element in place, said filter cover at least partially defining the filter cavity;
said main shell comprising bottom ribs, said bottom ribs have a tapered tip portion that is angled away from the filter cover from top to bottom to create a drain channel and said main shell comprising top ribs, said top ribs have a tapered tip portion that is angled away from filter cover from bottom to top to form a vent channel;
the filter cavity is at least partially defined by an upstream sidewall, a downstream sidewall spaced from the upstream sidewall, a third wall running from the upstream sidewall to the downstream sidewall, the filter inlet interfaces with the filter cavity at the third wall, and a fourth wall running from the upstream sidewall to the downstream sidewall and spaced from the third wall; and the filter element is shifted toward the upstream sidewall such that a distance between the filter element and the upstream sidewall decreases in a direction from the third wall to the fourth wall;
the filter element comprising a filter membrane to filter micron or submicron impurities from a process fluid disposed in the filter cavity, the filter element at least partially overlapping the filter inlet on a first side of the filter element, the filter element separating the upstream portion of the filter cavity from the downstream portion of the filter cavity, the filter element further comprising a potted rectangular pleated filter with a set of pleats having a first set of pleat tips on an upstream side of the filter element and a second set of pleat tips on a downstream side of the pleated filter, the sets of pleats packed together such that the first set of pleat tips form a generally planar rectangular entrance and the second set of pleat tips form a rectangular generally planar exit interface and wherein the primary flow path of the fluid through the filter element is perpendicular to the flow path through the filter inlet.

2. The filter assembly of claim 1, further comprising a flow guide disposed between the inlet and the filter element, the flow guide configured to direct flow from the inlet to the upstream sidewall.

3. The filter assembly of claim 1, further comprising a shifted parallelogram filter holding area, wherein the filter element is disposed in the shifted parallelogram filter element holding area.

4. The filter assembly of claim 1, wherein the filter element comprises a first flap and a second flap and wherein the first flap and second flap are retained between the filter cover and the filter housing.

5. The filter assembly of claim 1, further comprising symmetric main body portions.

6. The filter assembly of claim 1, wherein the first set of pleat tips form a generally planer rectangular entrance interface with the upstream portion of the filter cavity and the second set of pleat tips form a generally planer rectangular exit interface with the downstream portion of the filter cavity.

7. The filter assembly of claim 1, wherein the inlet interfaces with the filter cavity at the third wall and the outlet interfaces with the filter cavity at the fourth wall.

8. The filter assembly of claim 1, wherein the upstream portion of the filter cavity is shaped such that the upstream portion of the filter cavity has a decreasing hydraulic diameter away from the filter inlet and the downstream portion of the filter cavity is shaped to have an increasing hydraulic diameter toward the outlet.

9. The filter assembly of claim 1 where main shell has end ribs, bottom ribs, top ribs, and intermediate ribs.

10. The filter assembly of claim 1 where the filter inlet overlaps the drain channel.

11. The filter assembly of claim 1 where a filter vent overlaps the vent channel.

* * * * *